Oct. 15, 1957 F. P. GOHOREL 2,810,018

AUTOMATIC TELEPHONE SYSTEMS

Filed Oct. 12, 1953 11 Sheets-Sheet 1

Inventor
F. P. GOHOREL
By Robert Harding Jr.
Attorney

SG

Inventor
F. P. GOHOREL
By Robert Harding Jr.
Attorney

Oct. 15, 1957 F. P. GOHOREL 2,810,018

AUTOMATIC TELEPHONE SYSTEMS

Filed Oct. 12, 1953 11 Sheets-Sheet 3

Inventor
F. P. GOHOREL
By Robert Harding Jr.
Attorney

Oct. 15, 1957 F. P. GOHOREL 2,810,018

AUTOMATIC TELEPHONE SYSTEMS

Filed Oct. 12, 1953 11 Sheets-Sheet 4

Inventor
F. P. GOHOREL
By Albert Harding Jr.
Attorney

Inventor
F. P. GOHOREL
By Robert Harding Jr.
Attorney

AUTOMATIC TELEPHONE SYSTEMS

Filed Oct. 12, 1953 11 Sheets-Sheet 6

Inventor
F. P. GOHOREL
By Robert Harding Jr.
Attorney

Inventor
F. P. GOHOREL
By [signature]
Attorney

Inventor
F. P. GOHOREL
By Robert Harding Jr.
Attorney

Inventor
F. P. GOHOREL
By Robert Harding Jr.
Attorney

Oct. 15, 1957 F. P. GOHOREL 2,810,018

AUTOMATIC TELEPHONE SYSTEMS

Filed Oct. 12, 1953 11 Sheets-Sheet 10

Inventor
F. P. GOHOREL
By Robert Harding Jr.
Attorney

Inventor
F. P. GOHOREL
By Robert Harding Jr.
Attorney

United States Patent Office 2,810,018

Patented Oct. 15, 1957

2,810,018

AUTOMATIC TELEPHONE SYSTEMS

Fernand Pierre Gohorel, Antony, France, assignor to International Standard Electric Corporation, New York, N. Y., a corporation of Delaware Application October 12, 1953, Serial No. 385,600

Claims priority, application France November 4, 1952

11 Claims. (Cl. 179—22)

The present invention refers to automatic telephone systems and more particularly to arrangements for selecting a free line in a group corresponding to a predetermined call number. When the number of lines is large and only selectors of low or medium capacity are available, a combination of two selection stages is used. If $n$ designates the capacity of the first-stage selectors or "first selectors" and $p$ that of the second-stage selectors or "second selectors," said combination allows a choice among $n \times p$ lines. The number of lines to be provided in a predetermined group depends upon the traffic and can vary considerably from one group to another. It is therefore of interest that the position of a line on the selector banks bears no necessary relationship to the call number of said line and that it is possible to assign a predetermined call number to a line occupying any position whatever by simply displacing jumper wires.

One of the features of the invention lies in a group-selecting means consisting of the combination of a first-selection stage and a second-selection stage each comprising a plurality of selectors and a control device common to the selectors of these two stages, said device receiving the call number dialed and marking the free lines of the corresponding group "calling" on the banks of the second selectors having access to said lines, said second selectors being in turn marked calling on the banks of the first selectors having access to said second selectors, the common control device then controlling the hunting on the banks of the seized first selector for a second selector in calling position and the hunting on the banks of said second selector for a line in the called group.

Another feature of the invention lies in a group-selecting device consisting of the combination of a plurality of means similar to those of the preceding feature, each of the lines capable of being selected being multipled to all said means, any line incoming to the group-selecting device thus having access to all the outgoing lines of said device.

The invention is particularly applicable to telephone systems using crossbar switches.

Another feature of the invention lies in a control device for the routing of a call to a group-selecting means consisting of the combination of the following means:

(*a*) An "incoming connector" designed to ensure the connection between the seized first selector and the other control means;

(*b*) A "receiver" that receives, over the incoming connector, the signals required for the selection of the called line;

(*c*) A "marker" that interprets the signals received by the receiver and marks "calling" on the second-selector banks all free lines of the group corresponding to the call number dialed;

(*d*) Second "outgoing connectors" that mark calling on the first-selector banks all the available second selectors having calling lines on their banks;

(*e*) A first "outgoing connector" that is temporarily associated with the seized first selector and proceeds to hunt for a second selector in calling position, a second outgoing connector temporarily associated with the chosen second selector then proceeding to hunt for a line designated by the marker, arrangements being provided to connect the seized first selector to the second selector chosen by the first outgoing connector and to connect said second selector to the line chosen by the second outgoing connector.

In telephone systems using individual multiselector crossbar switches the choice of a line is usually made by a chain of relays arranged in a common control member (marker), the rank indication of the chosen line being then transferred by said control member to the selection magnets that prepare the connection of the seized selector to the chosen line. These selection magnets are common to all the selectors of one and the same frame. Said connection is then caused by a "connecting magnet" individual to said selector. These arrangements require a large number of relays in the common control member.

Another feature of the invention lies in using, in an outgoing connector associated with a selector frame, the selection magnets of these selectors to choose a line in calling position and then to prepare the connection of said line to a common control device, the selection magnet or magnets that have operated remaining energized to prepare the connection of the seized selector to the chosen line, this arrangement allowing the disabling of the chain relays usually provided in the common control member.

The first selectors of one and the same subdivision, that is, giving access to the same second selectors, can occupy several frames.

Another feature of the invention lies in providing, in one of the first-selector frames of a predetermined subdivision, one or more individual switches used as incoming connectors and, in another frame of said subdivision, a set of selection magnets used as an outgoing connector, said selection magnets being then used for the seized first selector in the case where said selector is in the same frame as the outgoing connector, selective indications being otherwise sent from the second to the first frame in order to cause in said first frame the operation of the selection magnets that are to control the seized first selector.

Another feature of the invention lies in the fact that, when the calling first selector and the outgoing connector are in two different frames, the incoming connector temporarily associated with the calling selector sends the outgoing connector a signal enabling it to identify the frame comprising the calling first selector, said outgoing connector being thus able to send said frame selective indications to cause the operation of the selection magnets of the calling first selector.

Another feature of the invention lies in assigning an individual switch to all or part of the selectors of one and the same frame in order to connect said selectors to the corresponding receiver and in using a bank contact of said individual switch to send to the outgoing connector the signal allowing identification of the frame comprising the calling selector, the position of said individual switch actually depending on the calling selector and hence on the frame comprising said selector.

Another feature of the invention lies in using the contacts associated with the outgoing connector's selection magnets to send the frame comprising the calling first selector the selective indications that will cause the operation of the selection magnets controlling the positioning of the first selector.

In telephone systems the traffic to be routed requires a number of subdivisions and in each subdivision a predetermined number of selectors or of frames.

Another feature of the invention lies in an incoming connector consisting of the combination of a plurality of individual switches, each of these individual switches being associated with a particular receiver and having access to selectors capable of belonging to different frames.

Another feature of the invention lies in a subdivision comprising a first frame carrying the incoming connector, a second frame carrying the outgoing connector and supplementary frames, the incoming connector carried by the first frame having access to the selectors of all the subdivision's frames, the outgoing connector controlling the hunting for an outgoing line for the selectors of all the frames.

Another feature of the invention lies in a subdivision comprising a plurality of frames, one of these carrying an outgoing connector controlling the hunting for the outgoing lines of this subdivision, all the selectors of said subdivision being controlled by an incoming connector capable of belonging to other subdivisions.

When the selection of the called line has ended, arrangements must be provided to test that line and to connect it to the calling selector, if the line is free.

Another feature of the invention lies in the fact that, when the second outgoing connector has definitely selected a line in calling position, it connects the marker to said line, said marker testing this line and, if said line has been selected only by the group-selecting means involved, sending the first selector a signal to put through the connection.

Another feature of the invention lies in the fact that, when the marker has been connected to the line selected by the second outgoing connector, a timing device is switched in said marker, said device operating after a predetermined period of time if the testing of the line is unsuccessful and removing the marking from the free lines of the group on the banks of the second selector, this removal causing the release of the second outgoing connector and hence the release of all the members seized.

In each group-selecting means, a first selector generally has access only to part of the second selectors of said means; in case the seized first selector has no direct access to the second selector or selectors in calling position, an "overflow selector" is used to establish the connection between said first selector and one of said second selectors.

Another feature of the invention lies in the fact that the available second selectors of a group-selecting means having calling lines on their banks are marked "calling" on the banks of all the available overflow selectors of said means, said overflow selectors being in turn marked calling on the banks of the first selectors belonging to the calling first subdivision, so that, if the seized first selector has no direct access to the second selector or selectors in calling position, the outgoing connector temporarily associated with said first selector proceeds to hunt for an overflow selector in calling position, the call being then routed from said overflow selector according to the same method as for a first selector.

When all the lines of the group dialed are busy, the calls are routed over an alternative route, if there is one for said group.

Another feature of the invention lies in the fact that the marking relay or relays of a predetermined line group prepare, if there is an alternative route for the lines of said group, the operation of a relay common to all the line groups, this operation becoming effective only if there is no line in the group marked and then causing a signal to be sent to the register to cause the routing of the call over said alternative route.

Each of the lines capable of being selected by the group-selecting device comprises a plurality of wires; said lines being further multipled to all the group-selecting means, substantial wiring must be provided between the second selectors and these lines.

Another feature of the invention lies in grouping on one and the said frame, and under the control of the same outgoing connectors, second selectors having access to the same outgoing lines but belonging to a plurality of different group-selecting means, each set of selectors of a predetermined group-selecting means being controlled by the marker assigned to that means and arrangements being provided to prevent the simultaneous positioning of two selectors of two different group-selecting means, these arrangements making it possible to simplify the wiring between the second selectors and the outgoing lines while preventing the wrong connections that could result from the simultaneous operation of selectors belonging to two different group-selecting means.

Various other features will become apparent from the following description, given as a nonlimitative example, with reference to the accompanying drawing, in which.

Figure 1:
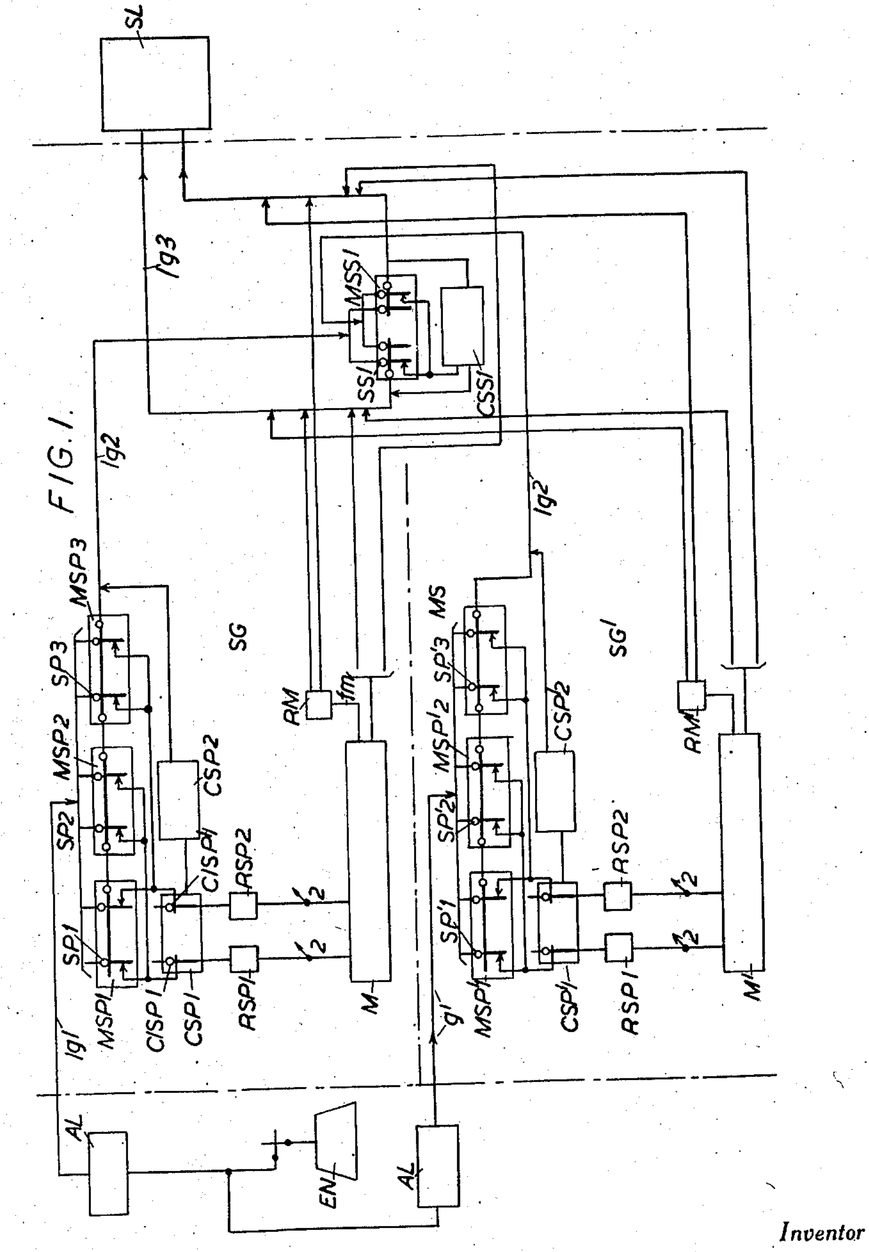
Fig. 1 is the switching diagram of the group-selecting means, showing the arrangement and distribution of the selectors and the associated members.

It will be assumed throughout what follows that the switches used for establishing a connection are crossbar switches or multiselectors of a known type comprising a number of individual switches giving access in common to the same outgoing lines. The selection of a predetermined outgoing line is effected by means of members called selecting bars. Each of these bars is associated with two selection magnets and can take two operating positions depending upon the magnet energized. In assuming one of these positions, said bar prepares the connection of two lines to two series of connecting bars. The choice of one of these two series is made by one or the other of the positions taken by a supplementary selecting bar, according to a known principle.

In the example described, 13 selecting bars are provided, not counting the supplementary bar, hence 26 selection magnets; this gives two series of 26 lines each or a total of 52 lines. The choice of a 26-line series is effected by one of the two magnets associated with the supplementary bar, or, that is, the separating magnet, the choice of a line within the series being effected by one of the 26 selection magnets mentioned above.

The selection magnets only prepare the connection of an individual switch to a line, said connection being caused by an operating or connecting magnet individual to each individual switch. The connection is held as long as this magnet remains energized, regardless of the position of the selection magnet that has prepared the connection. In the descriptions that follow it has been assumed that each multiselector comprised 17 individual switches; the first or last 15 or 16 switches are used for putting through the calls, the remaining one or two being provided to connect one of the other 15 or 16 to a common control member. These 17 individual switches are housed in a chassis or "frame."

It is possible, of course, to dispense with the use of the supplementary selecting bar for the selection of a line series; in that case, there will be only the selection of a line out of 26, but each line will comprise twice as many wires (10 instead of 5 in the example described). The supplementary selecting bar will operate like the other bars and will allow selecting two other lines, that is, 26+2=28 lines.

Figure 2:
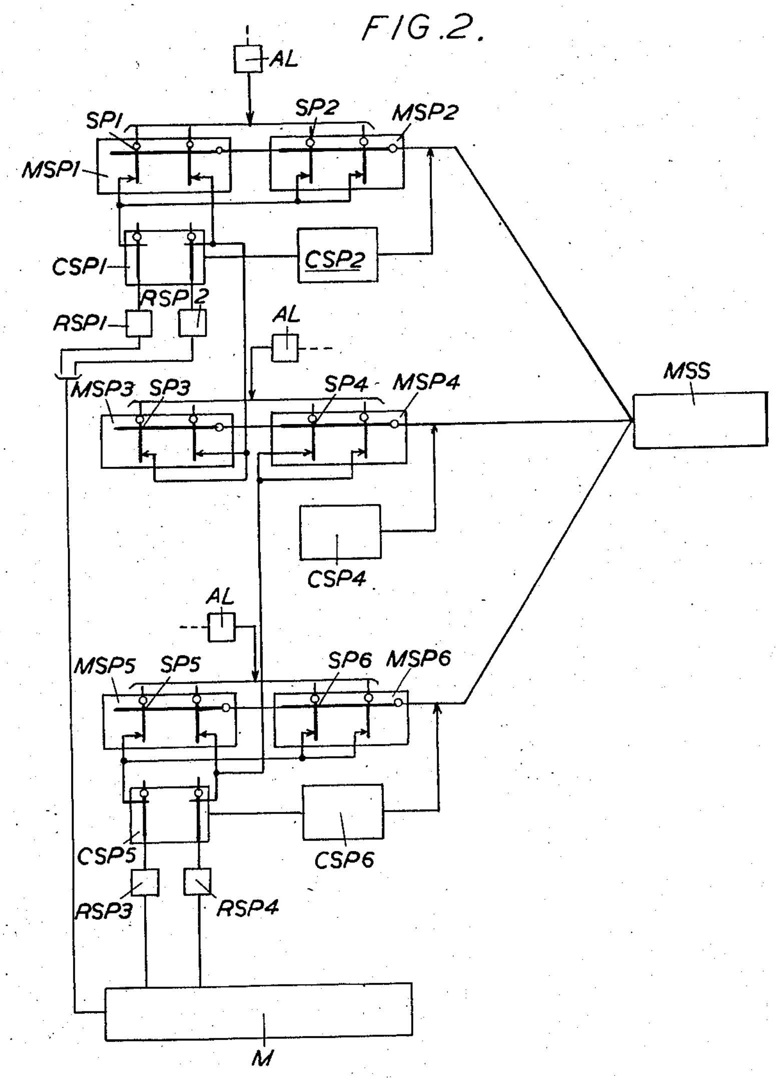
Fig. 2 is the switching diagram of the group-selecting means with a new and different distribution of the first multiselectors.
Figure 3:
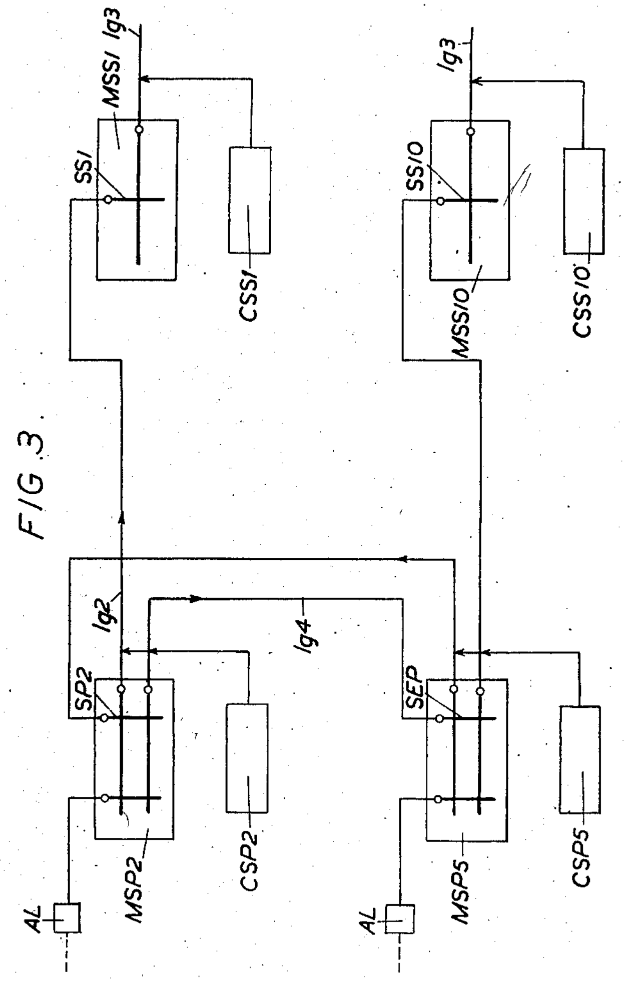
Fig. 3 is the switching diagram of Fig. 1 in the case of overflow.

In Figs. 1 to 3 these multiselectors are shown schematically by heavy perpendicular lines and are enclosed in rectangles drawn in finer, unbroken lines. Each vertical line represents an individual switch used as a selector having access to a number of outgoing lines (28 or 52, depending upon the case), each outgoing line being represented by a horizontal line. The various individual switches of one and the same multiselector generally give access to the same outgoing lines, that is to say, they constitute one and the same switch "subdivision." In certain cases, the individual switches of a plurality of multiselectors are grouped together to form one and the same subdivision.

It will be assumed throughout what follows that the group-selecting means involved belongs to an automatic switchboard serving 10,000 subscribers divided up into groups of 500.

This group-selecting means is designed to select a predetermined 500-line group within the automatic switchboard.

Throughout what follows a description will be given of the group selection in an automatic switchboard, that is to say, the cycle of operations designed to effect the selection of a group of a certain number of lines within the automatic switchboard.

For a predetermined volume of traffic, the group-selecting set comprises a number of means each controlled by a marker. Each means comprises a number of incoming lines; the outgoing lines of one means are multipled to the outgoing lines of the other means of the set.

A group-selecting means SG (Fig. 1) comprises two selection stages, the first stage consisting of first selector SP1 and the associated common members, connectors CSP1, CSP2 and receivers RSP1, RSP2, the second stage consisting of second selector SS1 and connector CSS1. Line *lg*1 incoming into first selector SP1 is connected to a feeding bridge AL.

As follows from the explanations given at the beginning of the description, each one of selectors SP1 gives access to 52 outgoing lines, but only 50 out of these 52 lines are used for the normal routing of calls, the last two being reserved for testing or for any other desirable purpose. Likewise, each second selector SS1 gives access to 52 outgoing lines, only 50 of which are used for the normal routing of calls. The set consisting of first selector SP1 and second selector SS1 will therefore allow selecting a line from among a number that can reach up to 50×50=2500 lines.

It will be assumed, as a nonlimitative example and for the sake of clarity in the description, that the group-selecting means gives access to 1000 outgoing lines to the line-selecting means SL that will select the called line from among the group selected.

It is evident that a single subdivision of second selectors giving access to 50 lines cannot serve the 1000 outgoing lines of the group-selecting means. It will therefore be necessary, in the example under consideration, to provide 20 second-selector subdivisions. All the first selectors such as SP1 give access to the 1000 outgoing lines of the group-selecting means, that is to say, it must be possible to connect them to the 20 second-selector subdivisions. As each first selector, such as SP1, gives access, as indicated above, to 50 outgoing lines to the second selectors, 40 lines outgoing from the first selectors to said second selectors can be made available for the normal routing of calls, reserving the other 10, for example, for overflow selectors.

The 40 lines outgoing from a first-selector subdivision are distributed evenly among the 20 second-selector subdivisions, each second-selector subdivision receiving two lines coming from a first-selector subdivision. The connection between the second first-selector subdivision and the second-selector subdivisions is made according to the same method.

As has been indicated, 40 of the 52 lines outgoing from the first selectors are used for the normal routing of calls. Of the 12 remaining lines, 10 are used as overflow lines *lg*4 (Fig. 3), in case the calling first selector has no access to a free second selector itself having access to a free line in the called group. These 10 lines terminate at overflow selectors SEP (Fig. 3) that allow reaching free second selectors having access to at least one free line in the called group, second selectors connected to the other first-selector subdivisions.

Thus, a group-selecting means SG comprises a stage of first selectors divided up into two subdivisions and a stage of second selectors divided up into 20 subdivisions, these two stages being controlled by a single marker M.

Fig. 1 shows the details of two adjacent group-selecting means SG and SG′ respectively controlled by marker M and marker M′, with a clearer view of the division of the lines into the various subdivisions.

It is evident that the final pattern of the division of the lines and of the first- and second-selector subdivisions of a group-selecting means SG will depend on the multiselectors used, which multiselectors have been described at the beginning of the present description.

It will be assumed that a first-selector subdivision comprises 3 multiselectors, the number of first selectors in a subdivision obviously depending on the traffic to be handled.

It will likewise be assumed in the example described that the second-selection stage of the group-selecting means involved comprises 10 multiselectors. If a second-selector subdivision comprises 8 second selectors, there are two second-selector subdivisions per multiselector. It has already been pointed out at the beginning of this description that the lines outgoing from the various group-selecting means are multipled to one another. However, the traffic to be handled requires only 4 selectors per second-selector subdivisions, so 4 subdivisions could be provided per second-stage multiselector, all four controlled by one marker. It is also possible, and this has been deemed preferable, to retain only 2 subdivisions per multiselector, each of them being controlled half by marker M and half by marker M′. The result of this is that the first four selectors of the multiselector MSS1 involved as also the selectors bearing numbers 9, 10, 11 and 12 are controlled by marker M, the selectors bearing numbers 5, 6, 7, 8 and 13, 14, 15, 16 being controlled by marker M′.

It follows from the preceding explanations that two adjacent group-selecting means SG and SG′ have their second-selector subdivisions in common. This solution offers many advantages, one of the more important being that it reduces the number of connections of the outgoing lines of the group-selecting means to the second-selector banks. Thus, the 20 second-selector subdivisions controlled by marker M have proper access to the 1000 outgoing lines of group-selecting means SG.

First selectors SP1 (Fig. 1) and second selectors SS1 are intended to connect a feeding bridge AL to a line-selecting means SL when a local call is involved, or to make a connection to a distant exchange or still to special services; the positioning of said selectors is controlled by a number of common members. It has been seen that a first-selector subdivision comprises three multiselectors MSP1, MSP2 and MSP3. These multiselectors are served by connectors; connectors CSP1, carried by the first frame MSP1, is the incoming connector, connector CSP2, carried by the second frame MSP2, being the outgoing connector. The third frame carries no common control member. Incoming connector CSP1 serves the selectors of the three multiselectors and its primary function is to find the selector SP1 seized and to connect it to a free receiver RSP1 or to a free receiver RSP2. The connection of the first selectors of the subdivision involved to a receiver is provided by the two individual switches *cisp*1 and *cisp'*1, which themselves consist of the first two bars of the first multiselector MSP1, the first bar operating if the calling selector belongs to the second frame or to the first half of the first frame, the second bar operating if the calling selector belongs to the third frame or to the second half of the first frame. The function of outgoing connector CSP2 is to find an outgoing line *lg*2 from the first selectors to the second selectors capable of routing the call.

It will be noted that Fig. 1 shows the two individual switches that connect the selectors to the receivers in an incoming connector. They are shown so as to make it easier to read the schematics. It is quite evident that these two switches, as has already been pointed out, belong to the first frame MSP1.

In the example shown, two receivers RSP1 and RSP2 correspond to one connector CSP1, the capacity of a receiver not allowing it to handle calls from more than 25 calling selectors. Receiver RSP1 is therefore associated with the selectors of the second frame and with those of the first half of the first frame, receiver RSP2 being associated with the selectors of the third frame and with those of the second half of the first frame.

The primary function of a receiver is to receive the digits characterizing the group of lines called, which lines are multipled to all the second-selector subdivisions.

The marker M associated with receivers RSP1 and RSP2 is designed to apply a marking potential to a wire corresponding to the called group, indicated by the digits received by receiver RSP1 for example; it also performs a double-test operation, which operation is intended to disable one of the chains of members controlled by one marker to the profit of a chain of members that are similar but are controlled by the second marker, if the two markers test simultaneously the outgoing lines of the called group.

Likewise, each second multiselector such as MSS1 comprises a connecting member, connector CSS1, whose own function as a common member consists in finding an outgoing line marked by the marker.

Having thus described the various members making up the group-selecting means SG, the operation of these members, shown in Fig. 1, will now be explained.

It will be assumed that a calling subscriber P has been connected by known means to a feeding bridge AL and to a register EN.

The first selector SP1 associated with feeding bridge AL is seized. Incoming connector CSP1 selects a selector SP1, SP2 or SP3 from among the selectors of the three multiselectors of the first-selector subdivision that can be seized simultaneously. It will be assumed that the selector SP1 chosen is the one connected to the calling subscriber. Since this selector belongs to the first half of the first frame, the first individual switch of multiselector MSP1 will be the one to operate to connect this selector to the receiver RSP1 to which it has access, provided this receiver is free. Otherwise, this connection will be held up until said receiver again becomes available. Receiver RSP1 then sends the register an "invitation to send" signal, the register then sending receiver RSP1 the digits that will be used to determine the called line group. Two digits are generally required. They are received in the form of a code made up of polarities or combinations of polarities.

When the reception of these digits has ended, receiver RSP1 is connected to marker M, if it is free. If this marker is busy, the connection is held up as previously explained. At the same time, receiver RSP1 tells the outgoing connector CSP2 located in the second frame of the first-selector subdivision of the seizure of the marker. If, as is the case in this description, the seized first selector belongs neither to the second nor to the third frame, the outgoing connector is also so advised.

Marker M then receives from receiver RSP1 the digits sent to it by the register, translates them and applies a marking potential to an individual wire *fm* corresponding to the line group thus determined. The marker can receive signals that allow it to determine up to 100 line-groups. One hundred wires such as the above can then be marked, each of these wires being assigned to a particular group.

A marking distributor RM receives these 100 wires at 100 input terminals, each output terminal corresponding to a group used. This arrangement allows changing the assignment of the lines to a group at will.

In the example described it is assumed that the 1000 lines outgoing from the group-selecting means are divided up into 40 groups. The number of lines in each group is not necessarily the same and depends on the traffic to be handled. However, all the groups can be reached by all the second-selector subdivisions, that is to say, any given second-selector subdivision always has access to at least one outgoing line in each group of lines. Over marking distributor RM marker M also brings into calling position all the lines of the called group that are free. These lines are marked "calling" on the banks of the corresponding second connectors CSS1. All free second selectors having access to the lines thus marked "calling" are in turn brought into "calling" position on the banks of the connectors CSP2 of the first selectors; a choice must be made among said selectors. All the second selectors of the group-selecting means involved are capable of being reached by the three first multiselectors MSP1, MSP2 and MSP3 served by outgoing connector CSP2; this connector can therefore receive calls from said second selectors. It chooses a second selector from among those in calling position and prepares the connection of said second selector to the first-selection stage.

This operation having been completed, outgoing connector CSP2 sends a signal to the connector CSS1 associated with the chosen selector SS1, to enable it to select a line *lg*3 from among those in calling position.

Connector CSS1 connects itself then to the called group's outgoing line *lg*3 that has just been selected and allows the marker to double test it. If the test is successful, marker M sends back to connector CSP2 through receiver RSP1 information determining the connection of the chosen second selector to the first-selection stage.

If, as has been assumed, the calling selector SP1 belongs to the first half of first frame RSP1, outgoing connector CSP2 is so told at the time marker M is seized by receiver RSP1. The outgoing connector then causes the operations that bring about in the incoming connector the connection of first selector SP1 to the chosen second selector and of said second selector to the line outgoing to line-selecting means SL.

This connection having been made, all the control members return to normal and can be used over again for the routing of a new call.

It may happen that the outgoing connector corresponding to the calling first selector has no access to a free second selector having access to a free line of the called group, that is to say, that the 40 outgoing lines such as *lg*2 (Figs. 1 and 3) of a first first subdivision to which outgoing connector CSP2 belongs are all busy. There are however second selectors capable of routing the call, but these selectors are connected to the first selectors of the second first subdivision, constituted by multiselectors MSP4, MSP5 and MSP6 of group-selecting means SG; they can be reached over a selector such as SEP belonging to the second frame of this subdivision. In order to be able to route the call it therefore suffices to find a line *lg*4 terminating at a selector SEP; said selector SEP then routes the call according to the same method as selector SP2. Line *lg*4 therefore acts as an overflow line; out of the 52 lines accessible to a selector SP, 40 are reserved for the normal routing of calls and 10 are used as overflow lines.

It has been assumed in the foregoing description that the called group comprised at least one free line. If the group contains no free line, second connector CSS1 can no longer hunt; and if there is no alternative route, the calling subscriber receives the busy tone. If there is an alternative route, it is marked over one of the output terminals of marking distributor RM. Marker M is so warned over this distributor and in turn indicates this new possibility to the register. The register then causes the release of all the members seized; the call is thereupon routed according to the same method and the register sends the receiver a signal corresponding to an alternative route.

It may happen that a call controlled by marker M' of group-selecting means SG' is received at the same time as a call routed by the first members controlled by marker M. If so, there are means in the second stage common to the two members SG and SG' to give priority to one of the two calls, the other being held waiting until the first has been routed.

It may happen that it is not desired to have three frames in a first subdivision. In this case, the second receiver RSP2 of the first subdivision would not use all its incoming-call handling capacity. The same would apply to receiver RSP4 of the second subdivision.

This calls for a new distribution of the first selectors of group-selecting means SG. This new distribution is shown in Fig. 2.

The 6 frames of the first stage of means SG are divided up into three subdivisions of two frames each, but the common control members remain identical with those already described in the first embodiment (Fig. 1). Frame MSP1 of the first subdivision carries incoming connector CSP1, which comprises two individual switches for connecting the calling selectors to the receivers. However, if the first of these switches connects to receiver RSP1 selectors of the second frame of the first subdivision and selectors of the first half of the first frame of this same subdivision, the second switch connects receiver RSP2 to the selectors of the second half of the first frame of the first subdivision and to the selectors of the first frame of the second subdivision. The same distribution is made for the second switch of the incoming connector of the third first subdivision, which is associated with receiver RSP4. This latter then controls the selectors of the second half of the first frame of the third subdivision and the selectors of the second frame of the second subdivision. In this way each of the 4 receivers associated with the 6 first frames works for 24 or 25 first selectors, this number representing the capacity of a receiver, as has already been pointed out.

Each subdivision comprises an outgoing connector located in the second frame. Frame MSP3 therefore carries neither an incoming nor an outgoing connector, but, as in the general case, upon the seizure of the marker by the second receiver the outgoing connector of the second subdivision is warned that the calling selector is comprised in the third frame, that is to say, in the first frame of the second subdivision.

With this distribution, a call is routed as already described for the general case.

An embodiment example will now be given with reference to Figs. 4 to 9, followed by a description of the operations involved in the routing of a local call in the group-selecting means.

In the descriptions that follow the contacts associated with the relays or magnets are designated by the same letter or group of letters as the relay or magnet, followed by one of the references 1 to 9. Only small letters are used to reference said contacts.

Only such circuit components as are necessary for an understanding of the invention are shown in the schematics. For example, certain sets of relays are connected up in a "chain," that is to say, they are so arranged that the simultaneous energization of these relays cannot occur; the details of these chain circuits are not shown.

In order to simplify the drawing, not all similar members or circuits have been shown, but only one member or circuit of each kind, their number being indicated in parentheses; for instance, where there are 25 selection magnets, only one is shown. In certain cases it has been necessary to show several relays performing the same functions. These relays are then designated by the same group of letters, followed by a number indicating whether the particular relay involved is the first, the second or the *n*th relay. The contacts will then be designated by the group of letters characterizing the relay, followed by two digits separated by a slant line; thus, contact *pch*1/2 will characterize contact No. 2 of relay *pch*1 and contact *pch*2/4 will characterize contact No. 4 of relay *pch*2.

Of course, if the function of a contact of these relays is so obvious that it has not been deemed necessary, for the sake of clarity in the drawing, to reproduce all the identical circuits to which said contacts of these relays respectively belong, such a contact will be designated as usual by the letters characterizing the particular relay involved, followed by the number denoting the rank of the contact in question; thus, the rank 2 contact of relays *pch*1 and *pch*2 is designated by *pch*2.

The individual members have been separated from the common members by dot and dash lines. The same applies to the various common members.

It will be assumed to begin with that the various selectors used for the routing of calls, as well as the associated common members, are free. Under these conditions, all the relays and magnets shown in Figs. 4 to 9 are in home position.

Figure 4:
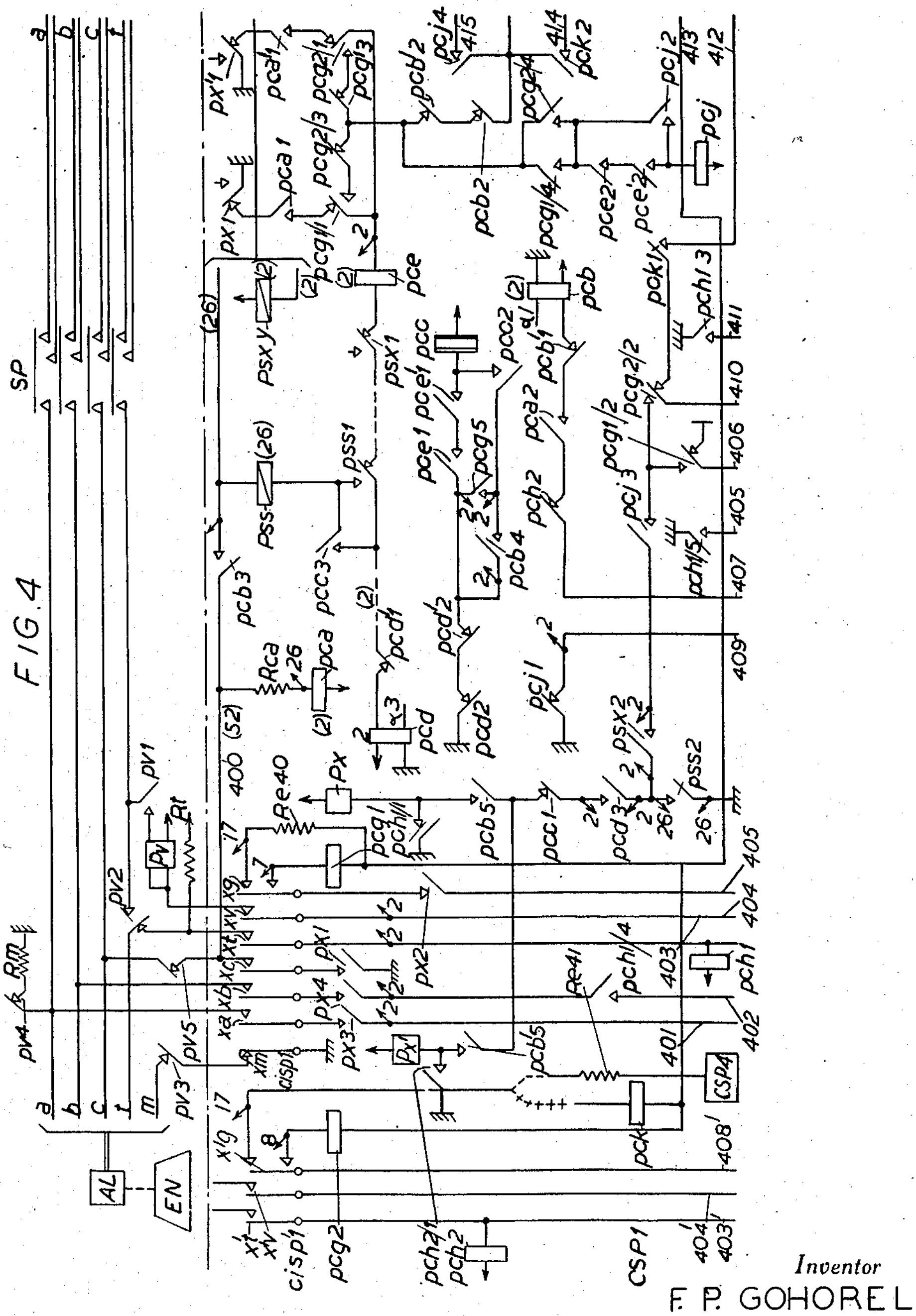
Figs. 4 and 5 are schematics of a first selector and of the associated connectors.

It will be assumed in the description that follows that the calling subscriber, connected by known means to feeding bridge AL and to register EN, has received a dialing tone from said register. He then dials the called subscriber's number by causing breaks in the line wires by means of his dial. The various pulses thus sent out are received by the register and are registered according to a known method; the register then applies a ground to the *t* and *c* wires of a first selector (Fig. 4). The following circuit is then completed: ground, wire *c*, back *pv*5, wire 400, resistance R*ca*, relay *pca* energized, battery. As stated, the 3 first multiselectors constituting the first first subdivision are 50-point multiselectors comprising 17 individual switches; out of these 17 switches, the first two of the first multiselector act as a connector. The set of 3 first multiselectors thus comprises 15+34=49 first selectors. Out of the 52 wires 400 provided, 49 are therefore respectively associated with the 49 first selectors of the 3 frames MSP1, MSP2 and MSP3, this where there are 3 frames per first subdivision; the last 3 wires are not used. The first selectors of the 3 frames are connected through wires 400 to two relays *pca*; the first *pca* relay corresponds to 24 first selectors comprising the 17 selectors of the second frame and the 7 of the first half of multiselector MSP1, the second *pca* relay corresponding to the 8 selectors of the second half of the first frame and the 17 selectors of the third. The *pca* relay energizing thus indicates, in the example described, the group of 24 or 25 first selectors containing the calling selector SP. It will be assumed that the *pca* relay energized is the first one; the calling selector is therefore comprised in the second frame or in the first half of the first frame. It will then be assumed that the calling selector belongs to the first frame. Relay *pca* completes the following circuit over its front *pca*1: battery, upper winding of relay *pcd*, back *pcd'*1, chain of back contacts *pss*1 and *psx*1, relay *pce*, back *pcg*1/1, front *pca*1, back *px*1, ground. Over its front *pca*2 it completes the following circuit: battery, lower winding of relay *pcb*, back *pcb'*1, front *pca*2, back *pch*2, wire 407, back *prl*1, wire 409, back *pcj*1, ground.

To connect receivers RSP1 and RSP2 to one of the 49 selectors capable of calling, two individual switches are available; the first corresponds to magnet P*x* and gives access to the first selectors of the second frame and to those of the first half of the first frame associated with receiver RSP1, the second individual switch corresponding to magnet P*x'* and giving access to the selectors of the second half of the first frame and to those of the third frame associated with receiver RSP2. In order to allow each of these switches to choose the calling selector, there are 26 magnets P*ss* that can be used by both individual switches, this being made possible by the fact that the two switches are mounted on one and the same frame. The 26 selection magnets P*ss* are divided up into two series of 13 magnets each. The magnets of the first series or "high" magnets are provided to operate the selecting bars in a predetermined direction and are all connected to a predetermined *pcd* relay over contacts such as *pcc*3; the 13 magnets of the second series or "low" magnets operate the selecting bars in the opposite direction and are all connected to the second *pcd* relay through contacts *pcc*3. The first relay *pcd* is connected over back contacts *pss*1 of the high magnets to relay *pce* and the second relay *pcd'* is connected over back contacts *pss*1 of the low magnets to relay *pce'*.

Over its contact *pca*1 the *pca* relay energized causes the energization of relays *pce* and *pce'* in each of the two previously-mentioned chains of contacts. These relays *pce* have a sufficiently high resistance to prevent the energization of relays *ped* in series respectively with each of the *pce* relays. The role of these relays *pce* is to verify that all the magnets P*ss* in the two previously-mentioned chains are in home position. This arrangement has been provided so that the operation of a magnet P*ss* for the routing of a given call cannot occur until the magnet used for the routing of a previous call has definitely returned to normal.

Relay *pcb* energizes over a circuit already described, a circuit completed by contact *pca*2 of the *pca* relay that has operated. Two *pcb* relays have been provided, each corresponding to a *pca* relay. The *pcb* relay energizes therefore requires, in the example described, that the calling selector SP belong to the first half of the first frame MSP1.

Over their front *pce*1 and *pce'*1 relays *pce* complete the energizing circuit of relay *pcc*: battery, relay *pcc*, front *pce'*1 and *pce*1, back *pcd'*2 and *pcd*2, ground. Relay *pcc* energizes.

Over one of its contacts *pcb*3 the *pcb* relay energized prepares the energizing circuit of one of the P*ss* magnets by connecting them to the *c* wire. Over its front *pcb*4 it prepares a holding circuit for relay *pcc*.

Upon energizing, relay *pcc* completes a holding circuit for itself over its front *pcc*2. Over its front *pcc*3 it completes the following energizing circuit for the P*ss* magnet associated with the calling selector: ground on the *c* wire, back *pv*5, wire 400, front *pcb*3, selection magnet P*ss*, front *pcc*3, back *pcd'*1, upper winding of relay *pcd*, battery. The two wires 400 respectively corresponding to the two first selectors of the same rank respectively served by receivers RSP1 and RSP2 are connected through front contacts *pcb*3 to one and the same selection magnet P*ss*.

It will be noted in this connection that magnets P*ss* are used twice: first for selecting the calling selector SP and then for connecting a calling selector to a line outgoing to the second selectors or to the overflow selectors; in this case, both separating magnets P*sx*/*y* will be needed. The P*ss* magnet corresponding to the calling selector energizes in series with relay *pcd*.

Upon energizing, relay *pcd* opens over its back *pcd*2 the energizing circuit of relay *pcc*, which is slowed slightly to allow magnet P*ss* to operate without fail. Over its front *pcd*3 it prepares with the P*ss* magnet seized the energization of magnet P*x*, an energization that will occur when relay *pcc* returns to normal.

Contacts *pcd*3 respectively associated with the two *pcd* relays are placed in parallel to the energizing circuit of magnet P*x* as indicated by the multiplying arrows on either side of *pcd*3. With contacts *pss*2, this proves that magnet P*x* energizes only when a P*ss* magnet and its associated *pcd* relay are energized.

Upon energizing, magnet P*ss* opens over its back *pss*1 the energizing circuit of relays *pce*, which release. Over its front *pss*1 it completes a holding circuit for itself. Over its front *pss*2 it prepares, as stated, the energizing circuit of magnet P*x*.

Upon homing, relay *pcc* completes the following circuit over its back *pcc*1: battery, magnet P*x*, front *pcb*5, back *pcc*1, front *pcd*3 and *pss*2, ground. Magnet P*x* energizes.

Upon energizing, magnet P*x* connects calling selector SP to receiver RSP1 (Fig. 4). Over its front *px*1 and associated contact *xc* of individual switch *cisp*1 it ensures the holding of the ground on the *c* wire and hence the holding of relay *pca*. Over its front *px*2 it prepares the energizing circuit of relay *pcg*1 and of relay *qcg* in series (Fig. 5), relay *pcg*1 indicating by its energization that calling selector SP belongs to the first half of the first frame. In effect, switch *cisp*1 gives access to 24 positions, the first 7 reached by contact *xg*, corresponding to the selectors of the first half of the first frame, being connected to a relay *pcg*1, the other 17, corresponding to the second-frame selectors and reached also by this contact *xg*, being connected directly to relay *qcg* across a resistance R*e*40. Over its front *px*3 and *px*4 and over associated contacts *xa* and *xb* of switch *cisp*1, magnet P*x* prepares the connection of receiver RSP1 to register EN. Contact *xt* of switch *cisp*1 completes the energizing circuit of relay *pch*1, which energizes over back *pv*2 to a ground applied by register EN to the *t* wire of the calling selector. Contact *xv* prepares the control circuit of the final connection.

Upon energizing, relay *pch*1 completes over its front *pch*1/1 a holding circuit for magnet P*x*. Over its back *pch*2 it opens the energizing circuit of relay *pcb*, which releases. Over its front *pch*1/3 it causes the operation of relay *prl* in receiver RSP1. Over its front *pch*1/4 it closes the circuit of the *b* wire to the receiver. Over its front *pch*1/5 relay *pch*1 applies a ground to wire 405 in order to prepare the operation of the various relays in the receiver and in the marker. Upon releasing, relay *pcb* opens over its front *pcb*3 the energizing circuit of magnet P*ss* and of relay *pcd* in series, which release. Over its front *pcb*5 it opens the energizing circuit of magnet P*x*, which holds, as already indicated.

Figure 7:
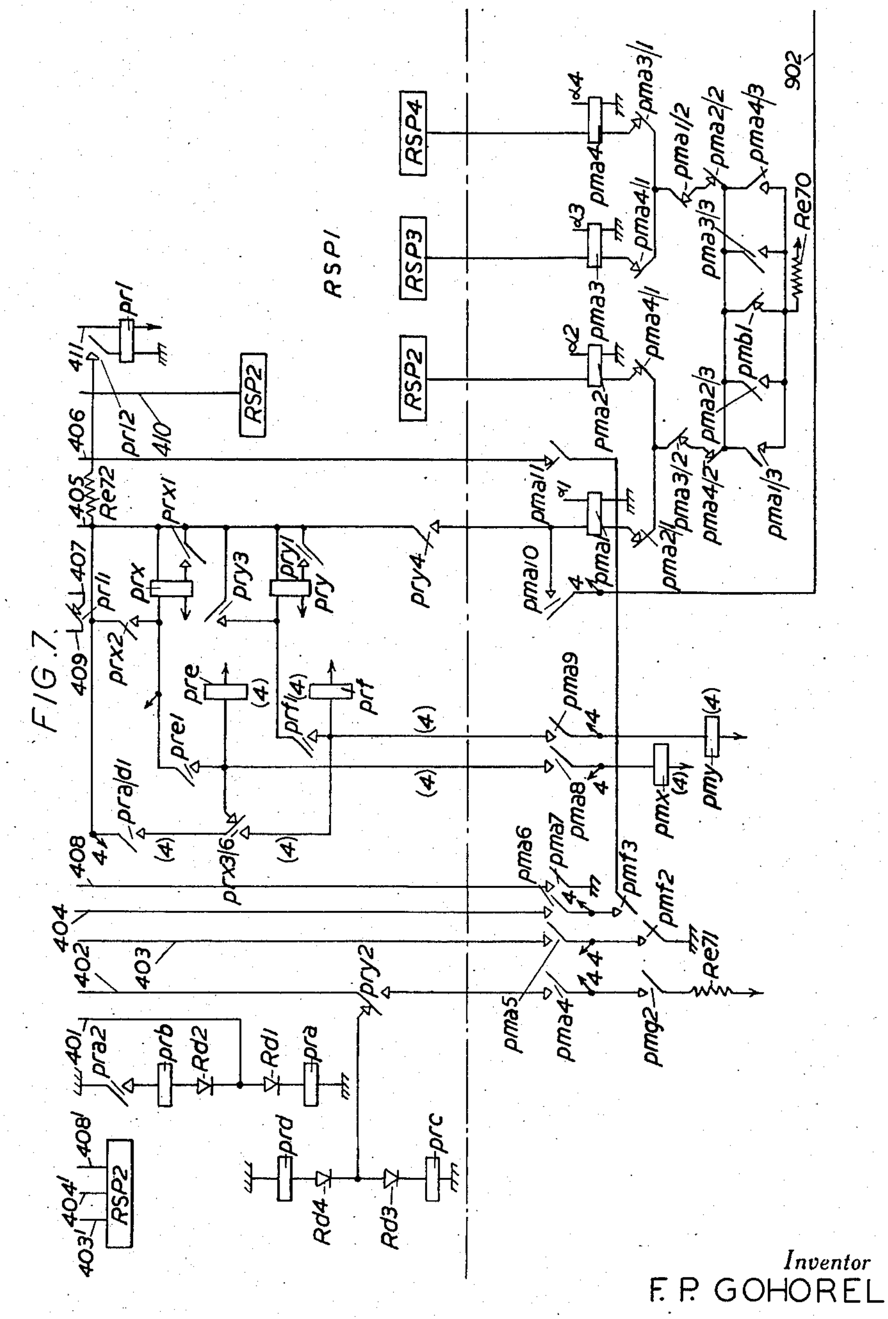
Figs. 7, 8 and 9 are schematics of the receiver and of the marker controlling the group-selecting means.

The connection has thus been made between connector CSP1 and receiver RSP1. This connection has been made possible by assuming that receiver RSP1 was not seized, as otherwise relay *prl* would have been energized and it would have been impossible to complete the energizing circuit for relay *pcb*, opened in that case by back contact *prl*1 (Fig. 7).

The code-receiving operations in RSP1 will now be described.

Upon energizing, relay *prl* makes a break at *prl*1 in wire 407 in order to mark the receiver busy; as a result, it opens the energizing circuit of relay *pcb*, which will no longer be able to energize until the full release of said receiver. Over its front *prl*2 relay *prl* prepares a holding circuit for itself over its high-resistance left-hand winding.

As has been indicated, code-receiving relays *pra* (Fig. 7), *prc* and *prd* are connected to the *a* and *b* line wires over the following two circuits:

(1) Wire *a* (Fig. 4), contact *xa* of individual switch *cisp*1, front *px*3, wire 401, rectifier R*d*1, relay *pra*, ground;

(2) Wire *b* (Fig. 4), contact *xb* of individual switch *cisp*1, front *px*4 and *pch*1/4, wire 402, back *pry*2, rectifier Rd3, relay *prc*, ground, and, in parallel with the preceding circuit, rectifier Rd4, relay *prd*, ground.

Register EN, finding a ground across relay *prd*, then sends receiver RSP1 the two digits used for the selection of a group. These digits are sent in the form of polarities or of combinations of polarities over the previously-described circuits. More specifically, the register can send over the *a* wire, if it is a question of the first digit, either a positive polarity or an alternating current. In the first case, only relay *pra* energizes; in the second case, relay *pra* energizes first under the effect of a positive alternation, closes its contact *pra*2 and thus allows the energization of relay *prb* under the effect of the next alternation. The register can send the *b* wire a positive polarity, a negative polarity or an alternating current. In the first case, only relay *prc* energizes; in the second case, only relay *prd* energizes and in the third case both relays *prc* and *prd* energize. By means of the 4 receiving relays *pra, prb, prc, prd*, therefore, $2^4=16$ possible combinations could be obtained. In fact, relay *prb* cannot energize without relay *pra*, this excluding 4 combinations. The same applies for the transmission of the second digit.

Only 10 out of the 12 possible combinations are used. Since the receiving relays receive two consecutive pulses from the register, there will be 100 possible combinations.

Relays *pra . . . prd* are designed to receive the two selective combinations sent by the register, but they release as soon as the reception of said combinations has ended. Four relays *pre* are available to register the first combination in receiver RSP1; the first *pre* relay is connected through a back contact *prx*3 to front contact *pra*1 . . . , the fourth *pre* relay being connected through contact *prx*6 to front contact *prd*1. Four relays *prf*, arranged in the same manner, are available to register the second combination sent by the register.

It will be assumed, to fix the ideas and for the sake of clarity, that only relay *pra* has operated upon the reception of the first digit. At *pra*1 it completes the following circuit: battery, relay *pre*, back *prx*3, front *pra*1, wire 405, front *pch*1/5, ground. Relay *pre* energizes.

When the reception of the first digit is over, relay *pra* releases, opening the energizing circuit of relay *pre* at *pra*1.

This relay *pre* does not release, because it completes a holding circuit for itself over its front *pre*1 across the upper winding of relay *prx* and the general ground of the receiver over front *pch*1/5 (Fig. 4).

Relay *prx* energizes. Over its front *prx*1 it completes a holding circuit for itself across its lower winding to the general ground of the receiver. Over its front *prx*2 it short-circuits its upper winding, something that will allow better operation of the corresponding registering relay in the marker. Upon opening its four back contacts *prx*3/6, relay *prx* cuts out the four first-digit registering relays *pre*; over its four front contacts *prx*3/6, it prepares the operation of the four second-digit registering relays *prf*.

The second digit is received by relays *pra . . . prd* according to the same method as for the first digit.

It will further be assumed, for the clarity of the description, that relay *pra* is the one that operates. Relay *prf* energizes over the following circuit: battery, relay *prf*, front *prx*3, front *pra*1, wire 405 (Fig. 4), front *pch*1/5, ground.

When the reception of the second digit is over, relay *pra* releases, opening the energizing circuit of relay *prf* over its contact *pra*1. This relay does not release. It has in fact completed the following holding circuit for itself over relay *pry*: battery, relay *prf*, front *prf*1, upper winding of relay *pry*, wire 405 (Fig. 4) and ground across front *pch*1/5.

Upon energizing, relay *pry* completes a holding circuit for itself over its front *pry*1, across its lower winding, to the general ground of the receiver. Over its back *pry*2 it removes the ground from the *b* wire to tell the register that the two digits have been properly received; over its front *pry*2 it prepares the connection of the *b* wire to the marker. Over its front *pry*3 relay *pry* short-circuits its upper winding to allow better operation of the corresponding registering relay in the marker. Over its front *pry*4 it completes the following circuit, causing the release of marker M: battery (Fig. 7), resistance R*e*70, back *pmb*1, *pma*4/2, *pma*3/2 and *pma*2/1, left-hand winding of relay *pma*1, front *pry*4 and general ground of the receiver across contact *pch*1/5. Relay *pma*1 energizes. There are four *pma* relays, corresponding to the four receivers capable of being served by a marker. The relay *pma*1 energized is the one associated with receiver RSP1, itself associated with the calling selector by switch *cisp*1, controlled by magnet P*x*.

The multipling arrows bearing index 4 and found on contacts *pma*4 to *pma*11 indicate that circuits identical with those shown exist for the four *pma* relays, that is to say, for the four receivers.

Upon energizing, relay *pma*1 completes a holding circuit for itself over its front *pma*1/3. Over its front *pma*4 to *pma*11 it causes the connection of the marker to the receiver.

Over its front *pma*7 the relay *pma*1 that has operated completes the following circuit: ground, front *pma*7, wire 408, front *px*2, contact *xg* of individual switch *cisp*1, relay *pcg*1, wire 413, relay *qcg*, battery. Relays *pcg*1 and *qcg* energize in series.

As already pointed out, relay *pcg*1 energizes to tell outgoing connector CSP2 that the calling selector belongs to the first half of the first frame.

Over its front *pcg*1/1 relay *pcg*1 prepares the re-energizing circuit of relays *pce* and over its front *pcg*1/4 the energizing circuit of relay *pcj* of incoming connector CSP1. Over its front *pcg*5 it prepares a holding circuit for relay *pcc*.

The method of retransmitting the dialed digits from the receiver to the marker will now be described. To register the first selective combination in this marker there are four relays *pmx*, respectively connected to the four relays *pre* through contacts *pma*8. Likewise, to register the second selective combination there are four relays *pmy*, respectively connected to the four relays *prf* through contacts *pma*9.

Over its front *pma*8 and *pma*9 the *pma* relay that has operated causes the closing of the following circuits:

(1) Ground (Fig. 4), front *pch*1/5, wire 405, front *prx*2, front *pre*1 associated with the *pre* relay that has operated, front *pma*8, relay *pmx*, battery;

(2) Ground, front *pch*1/5, front *pry*3, front *prf*1 associated with the *prf* relay that has operated, front *pma*9, relay *pmy*, battery.

These relays *pmx* and *pmy* energize and by their energization combinations indicate the called group in the same way as relays *pre* and *prf*.

Figure 8:
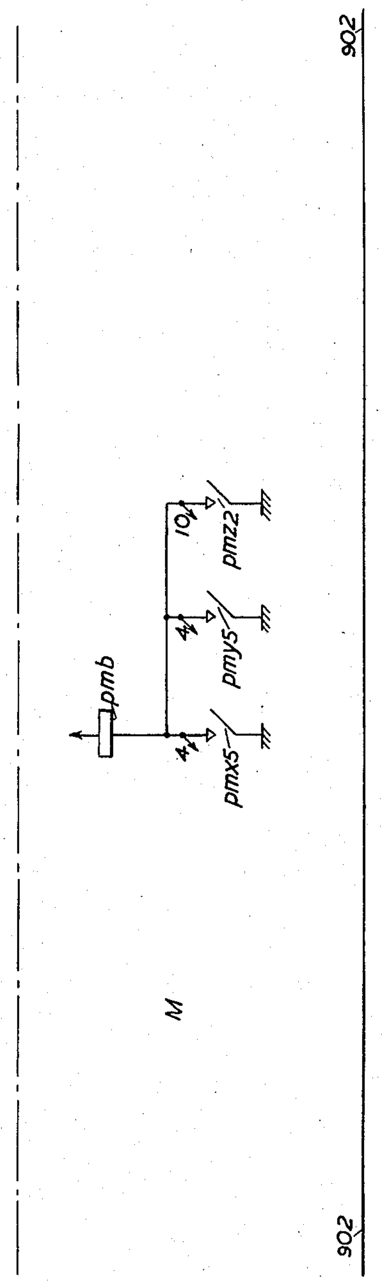
Figure 9:
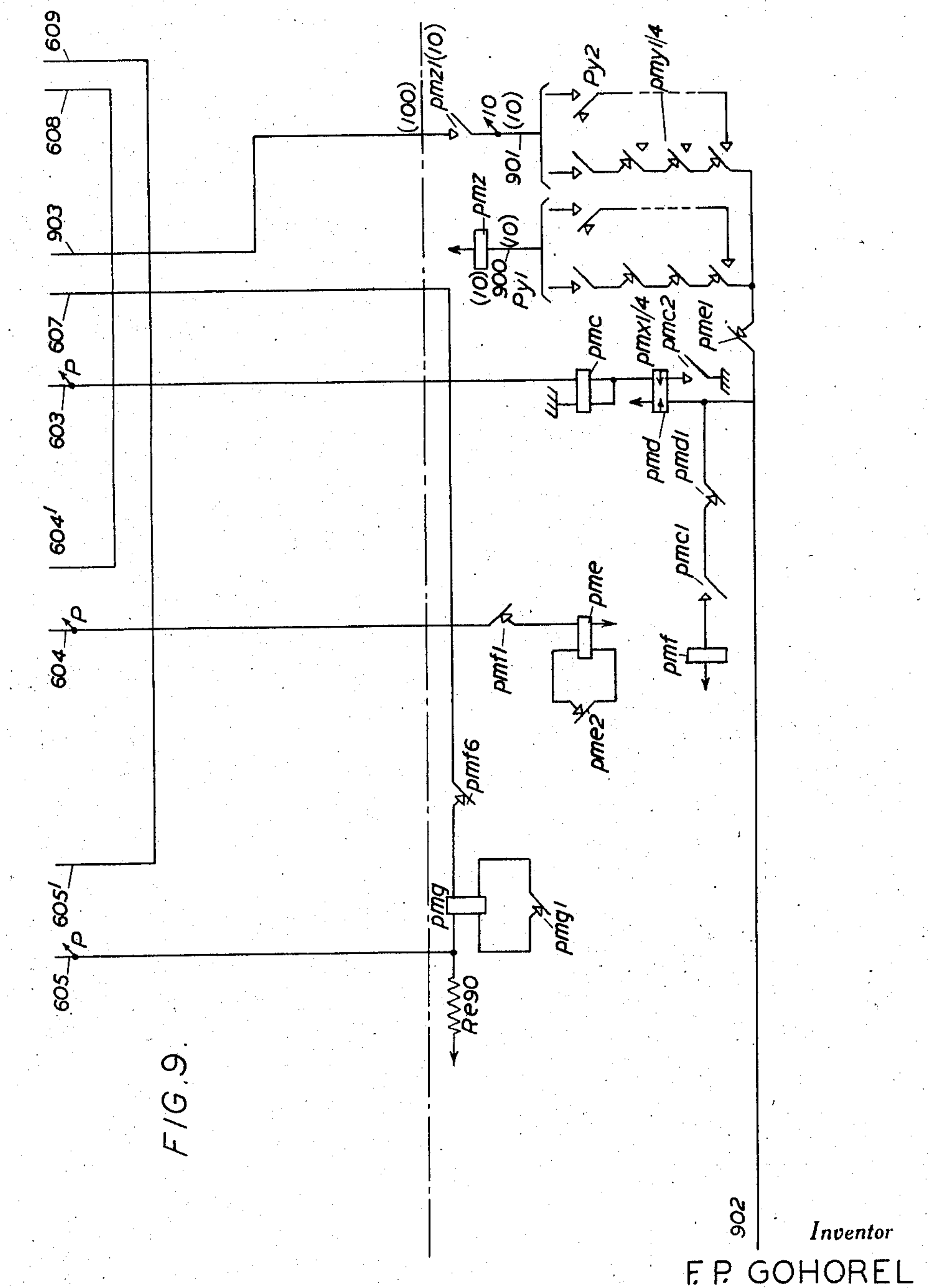

The contacts of relays *pmx* are arranged according to a known method to form a pyramid Py1 (Fig. 9). This pyramid comprises a single incoming wire, connected to back *pme*1, and 10 outgoing wires 900, respectively corresponding to the 10 first-rank digits capable of being sent by the register. Each one of these wires is connected to one of 10 relays *pmz*. The *pmz* relay corresponding to the first digit sent by the register energizes over the following circuit: battery (Fig. 9), relay *pmz*, wire 900, contact pyramid Py1, back *pme*1, wire 902 (Figs. 8 and 7), front *pma*10, ground over a circuit already described.

Likewise, the contacts of relays *pmy* are arranged according to a known method to form a pyramid Py2. This pyramid, in parallel with pyramid Py1, likewise comprises a single incoming wire, connected to back *pme*1, and 10 outgoing wires 901, corresponding to the 10 digits capable of being dialed. As previously explained, since the group-selecting means contemplated can serve 100 line-groups, 10 wires 901 have been provided, multipled to the 10 contacts pmz1 respectively associated with the 10 *pmz* relays, this giving 100 wires 903, each of these 100 wires corresponding to one combination among the 100 that can be made up by the first two digits.

In parallel with the circuits of the two pyramids, relay pma (Fig. 7) over its front *pma*10, completes the circuit of the left-hand winding of differential relay *pmd* (Fig. 9). This relay energizes.

Over its front *pmx*5 (Fig. 8) relay *pmx* completes the energizing circuit of relay *pmb*, a circuit placed in parallel with an identical circuit controlled by front *pmy*5 of relay *pmy*. The multipling arrows bearing index 4 and found on these two circuits are due to the fact that, as has already been seen, there are four *pmx* relays and four *pmy* relays.

Over its front *pmz*2 relay *pmz* completes a holding circuit for relay *pmb* in parallel with the two preceding ones. The multipling arrow bearing index 10 is explained by the fact that relay *pmb* is connected to the 10 contacts in parallel *pmz*2 of the 10 *pmz* relays. Over its front *pmz*1 relay *pmz* connects to marking distributer RM the wire 903 (Figs. 9 and 6) corresponding to the combination dialed, a wire that has been marked among the 100 issuing from the set made up of pyramid Py2 and contacts *pmz*1.

Relay *pmb,* which remains energized as long as relays *pmx, pmy* and *pmz* are themselves energized, prevents the seizure of the marker until these relays have homed. In fact, over its back *pmb*1 relay *pmb* removes the availability battery from the marker and marks it busy for the various receivers to which it has access.

Marking distributer RM (Fig. 6) comprises 100 input terminals *bn* and a certain number of output terminals *bs*. The 100 input terminals correspond respectively to the various digits sent by the register and are respectively connected to the 100 wires 903. Each output terminal corresponds to a group of lines outgoing from the second selectors and is connected to a relay *sm*. An input terminal corresponding to a predetermined digit is connected to the output terminal of the line group reached by means of that digit. A plurality of input terminals can be connected to one and the same output terminal. Thus, through this distributor RM, it is possible to change at will the distribution of the lines of the called group on the banks of the second selector, or even to change the assignment of lines to a group. Each *sm* relay controls in principle up to 10 lines and if there are more than 10 lines a plurality of relays are multipled to one and the same marking wire.

Marker M, as has been seen, having marked a potential on the particular wire corresponding to the called line-group, one *sm* relay energizes.

Over its front *sm*1 relay *sm* extends the ground of the *m* wire to a free outgoing line in the called group, a ground located in the line-selecting means, over a back contact *sl*1 up to second connector CSS1. The following circuit is then completed: battery (Fig. 6), relay *sca*, resistance Re60, wires 600 and 601, marking distributer RM, front *sm*1, wire *m* across distributer RP1, back *sl*1, ground. Similar circuits are completed for all the free lines in the group dialed. There are four *sca* relays, corresponding to the lines marked by marker M, and four *sca'* relays, corresponding to the lines marked by marker M', each of them being connected to 26 wires 600 each corresponding to an outgoing line. It follows from the preceding explanations that each marker M and M' has four of these relays for one and the same second multiselector. Likewise, the set of four second selectors out of the eight comprised by each of the 2 subdivisions under consideration, a set controlled by marker M, has two *sca* relays. Consequently, the first *sca* relay corresponds to the first four selectors of the first second subdivision and to the first 26 outgoing lines reached by said selectors; the second *sca* relay corresponds to the same selectors but to the last 26 outgoing lines. The same will apply to the third and fourth *sca* relays, in the second subdivision of the second multiselector. There are therefore 4×26=104 outgoing lines reached by the set of 8 selectors of the two subdivisions of the second multiselector under consideration, these selectors being controlled by marker M; the four *sca'* relays perform similar functions with respect to these same outgoing lines when the call is routed across the second marker.

As has already been explained, relay *sm* upon closing its front contacts *sm*1 applies a ground to all the free lines in the called group. Since a plurality of the lines in the group can belong to one and the same second multiselector, a plurality of *sca* relays could energize.

It has been seen that the outgoing lines of a group-selecting means were multipled to the outgoing lines of the other group-selecting means. It follows that two markers M and M' for example would be capable of controlling the hunting among the same lines of the group involved at the same time. It will be assumed throughout what follows that only marker M is in operation, marker M' remaining at rest.

It has also been seen that the selectors of a second multiselector were divided up into two subdivisions of 8 selectors each, each of these subdivisions being controlled half by marker M and half by marker M'. Moreover, each of these 2 subdivisions has access to 52 outgoing lines, 50 of which, as has been indicated, are used to route the traffic, the other two being reserved for tests or any other desirable purpose.

It will now be assumed that the first *sca* relay energizes, the free line or lines of the called group being comprised in the first 26 lines of the first subdivision of second selectors.

Over its front *sca*1 relay *sca* prepares the sending of a ground to the outgoing connector of the first stage having access to the second selectors of the subdivision involved. Over its front *sca*2 it prepares the energizing circuit of the *scb* relay corresponding to the *sca* relay that has operated. Over its front *sca*3 it completes the following circuit: battery, relay *scf*, back *scf'*1, front *sca*3, ground.

There are two relays *scf* and *scf'* respectively corresponding to the two markers M and M' capable of controlling the second selectors of the group-selecting means involved. Relay *scf* is controlled by the closing of one of the four contacts in parallel *sca*3 respectively belonging to the four *sca* relays, contacts *sca'*3 being associated with the second *scf'* relay.

Marker M being in operation in the case under consideration, it is relay *scf* that energizes. Over its front *scf*2 it prepares the circuit of the right-hand winding of relay *pme* (Fig. 9). Over its front *scf*4 (Fig. 6) it prepares the connection of the test circuit to marker M. Over its front *scf*7 it completes the following circuit: battery, upper winding of relay *scd*, back *scd'*1, chain of back contacts *sss*1, relay *sce*, back *ssx*1, front *scf*7, ground. There are two contacts *scf*7 of the two *scf* relays and two contacts *ssx*1 of the two separating magnets S*sx/y*. The two contacts in parallel *ssx*1 are connected to the two chains of "high" and "low" contacts of magnets S*ss*, each comprising one *sce* relay. These two chains therefore energize and by their energization prove that all the magnets S*ss* and S*sx/y* are in normal position. It will be noted that relays *scd* and *scd'* do not energize, relays *sce* and *sce'* having a very high resistance.

Over their front *sce*1 and *sce'*1 relays *sce* complete the following circuit: battery, relay *scc*, front *sce'*1 and *sce*1, back *sy*1, *scd'*2 and *scd*2, ground. Relay *scc* energizes.

It is a question now of bringing into calling position on the banks of the first selectors all the second selectors capable of routing the call, that is to say, the second selectors belonging to the subdivision having one or more free lines belonging to the group dialed. To that end there are available a number of circuits arranged as follows: contact *scf*6 (Fig. 11) is multipled to the four contacts *sca*1 . . . *sca*4/1 respectively associated with the four different *sca* relays. The two contacts *sca*1/1 and *sca*2/1, corresponding to the first subdivision of the multiselector under consideration, are connected to one and the same wire 602; likewise, the two contacts *sca*3/1 and *sca*4/1, corresponding to the second subdivision of the multiselector under consideration, are connected to one and the same wire 603. Wire 602 is connected to four wires *m*1 to *m*4 each connected to a second selector of the first subdivision. Likewise, the four wires *m*5 to *m*8 are each associated with the four second selectors of the second subdivision. A wire such as *m*1 corresponding to a predetermined second selector is connected to a first selector across distributer RP2.

The connection between first and second selectors is so effected that each first selector of any particular subdivision has access to the second selectors of all the second subdivisions and consequently to all the outgoing lines of the group-selecting means. The first two lines outgoing from a first first subdivision are respectively connected to two second selectors of the first second subdivision, the next two lines being connected to two second selectors of the second second subdivision. The same applies to the other outgoing lines of the first first subdivision. The connection is similar between the outgoing lines of the second first subdivision and the second subdivisions. It follows from the preceding explanations that each second subdivision comprises four second selectors. Twenty wires *m* (Fig. 5) are connected to a relay *qca* through a resistance Re50. Likewise, the other 20 wires *m* are connected to a second *qca* relay. The multipling arrow bearing index 26 is explained by the fact that the first-selector banks contain other lines, reserved for other purposes.

The following circuit is completed as soon as relay *scf* has operated: ground, front *scf*6, front *sca*1 of the *sca* relay that has operated, wire 602, back *sv*2, wire *m*1, distributor RP2, resistance Re50, relay *qca*, battery. Similar circuits are completed over wires *m*2 to *m*4 for the other three second selectors of the subdivision involved.

It will also be noted that the *qca* relays of the calling second selectors are energized in the various first outgoing connectors of the group-selecting means involved. It will be assumed that only one *qca* relay energizes.

Over its front *qca*2 relay *qca* completes the energizing circuit of relay *qcb*, which energizes. There are two *qcb* relays, each corresponding to one *qca* relay, the two contacts *qca*2 associated with the two *qca* relays being respectively connected to the two *qcb* relays; the *qcb* relay energized therefore characterizes, like the *qca* relay, the 20-line group comprising the lines in calling position. Relay *qca* completes the following circuit over its front *qca*3: battery, upper winding of relay *qcd*, back *qcd'*1, chain of back contacts *qss*1, relay *qce*, back *qsx*1, front *qca*3, ground. Relays *qce* energize to each of the two chains comprising the "high" and "low" contacts of magnets Q*ss*. In fact, magnets Q*ss* and relays *qcd* and *qce* are arranged according to a method already described for magnets P*ss* and relays *pcd* and *pce* of the incoming connector.

Over its front *qcb*2 the *qcb* relay energized prepares the energizing circuit of one of the 26 selection magnets Q*ss* and one of the two associated relays *qcd*. Over its front *qcb*3 it prepares the energizing circuit of one of the two magnets Q*sx*/*y*. Over its front *qcb*4 it prepares a holding circuit for relay *qcc*.

As has been indicated, the 40 outgoing lines of the first subdivision involved are divided up into two 20-line series. To choose one of these series there are two selection magnets Q*sx* and Q*sy*, the energization of which depends upon the particular *qcb* relay energized, magnets Q*sx* and Q*sy* being respectively connected to contacts *qcb*3 belonging to the two *qcb* relays; 20 magnets Q*ss* are available to choose a given line in a series.

Upon energizing, relays *qce* verify that none of magnets Q*ss* and Q*sx*/*y* is in operating position. They complete the following circuit over their front *qce'*1 and *qce*1: battery, relay *qcc*, front *qce'*1 and *qce*1, back *qcd'*2 and *qcd*2, ground. Relay *qcc* energizes.

Over its front *qcc*2 relay *qcc* completes a holding circuit for itself across contacts in parallel *qcb*4 of the two *qcb* relays. Over its front *qcc*4 it completes the following energizing circuit for one of magnets Q*sx*/*y*: battery, magnet Q*sx*, front *qcb*3 and *qcc*4, ground. The Q*sx* magnet energized corresponds to the *qcb* relay energized. This Q*sx* magnet determines together with the Q*ss* magnet energized the choice of a free second selector from among those capable of routing the call. It will be noted that there are two Q*sx*/*y* magnets, each corresponding to one of the two *qcb* relays and one of the two *qca* relays.

Over its front *qcc*3 the *qcc* relay completes the following energizing circuit for magnets Q*ss* in series with relays *qcd*: battery, upper winding of relay *qcd*, back *qcd'*1, front *qcc*3, magnet Q*ss*, wire 500, front *qcb*2, wire *m* (Fig. 6) and previously described circuit. The 20 magnets Q*ss* capable of energizing are divided up into two chains as previously indicated, each of these chains corresponding to a *qcd* relay. Since one or more calling lines can be comprised in each chain, each *qcd* and *qcd'* relay carries a second winding, which can be looped in succession to resistances of varying value by cam systems or any other similar means. This arrangement imparts to the relays a delay that varies according to a predetermined cycle, the time lag being all the greater when the second winding of the relay is looped to a lower resistance. This device was described in a patent application filed by applicant on December 4, 1952, Serial No. 323,992, "Telephone Systems" (Inventor: F. P. Gohorel). This cyclical priority to one or more relays constitutes a mode of distributing calls at random and will be come across many times in the description of the system.

One of the *qcd* relays, faster than the other, operates and over its back *qcd*1 opens the circuit of the second relay *qcd'* and that of the two Q*ss* magnets associated with this *qcd'* relay. It will be assumed that the *qcd* relay energized first gives priority to the chain of "high" Q*ss* magnets.

Over its back *qcd*2 the *qcd* relay energized opens the energizing circuit of relay *qcc*, which is slightly slowed and does not release immediately, to give magnet Q*ss* time to energize fully.

Upon energizing, magnet Q*sx* opens over its back *qsx*1 the energizing circuit of relays *qce*, which release. These relays then open the energizing circuit of relay *qcc*, which holds over a circuit already indicated, until the opening of contact *qcd*2.

The Q*ss* magnet energized completes a holding circuit for itself over its front *qss*1. Over its front *qss*2 associated with the front contacts *qsx*2 of magnet Q*sx* and *qcd*3 of the *qcd* relay energized, magnet Q*ss* prepares the connection of the line selected by magnets Q*ss* and Q*sx* to the second selector that must route the call, this circuit causing the hunting for a free line in the called group by said selector. This circuit will be completed when relay *qcc* returns to normal. Over its front *qss*4 associated with front *qsx*4 magnet Q*ss* prepares the re-energizing circuit of suitable magnets P*ss* and P*sx* in first multiselector MSP1.

Where there are a plurality of lines to the second selectors capable of routing the call, a plurality of magnets Q*ss* can energize simultaneously. When slow relay *qcc* releases, it opens at *qcc*3 the energizing circuits of all these Q*ss* magnets; the magnet closest to relay *qcd* holds over its front *qss*1 and over its back *qss*1 prevents the other magnets from holding over similar circuits.

Over its front *qcc*4 this *qcc* relay upon releasing opens the energizing circuit of magnet Q*sx*, which holds on a ground across front *qsx*1 and *qca*3.

It has previously been explained that relay *qcg* of outgoing connector CSP2 was energized upon the seizure of marker M by receiver RSP1.

Over its front *qcg*1 relay *qcg* completes the following circuit across back $qcc1$: ground, front $qcg1$, front $qcd3$, back $qcc1$, front $qsx2$ and $qss2$, wire *d* (Fig. 6), distributor RP2, front $scf5$ and $sca2$, back $scb'1$, upper winding of relay *scb*, battery.

This circuit will release the various operations involved in the hunting, by the second selector chosen, for a free line in the group dialed. The control of this hunting is effected over wire *d*. In outgoing connector CSP2, wire 501 is connected to the two contacts $qsx2$, $qsy2$ of the separating magnets Q*sx* and Q*sy*, which by their energization determine whether the outgoing first line belongs to one or the other of the two series of lines respectively connected to the two halves of the banks of the selectors of multiselector MSP2. Wire 502 is then connected to 20 contacts $qss2$ of magnets Q*ss*1 to Q*ss*20, corresponding to the 20 direct lines of the first series of outgoing first lines. A similar arrangement is provided for the 20 direct lines of the second series. Thus are obtained 40 wires *d*, respectively corresponding to the direct lines outgoing from the first first subdivision and connected in the manner that has been indicated for the various second subdivisions.

An arrangement similar to the one that has just been described will be noted for the contacts of the magnets Q*ss* used for overflow selectors.

As has been indicated, the second-selector connector comprises four relays *scb*, corresponding to four relays *sca*, and four relays *scb'*, corresponding to four relays *sca'*. Each of these four *scb* relays is connected to contact $sca2$ of the corresponding *sca* relay.

Figure 12:
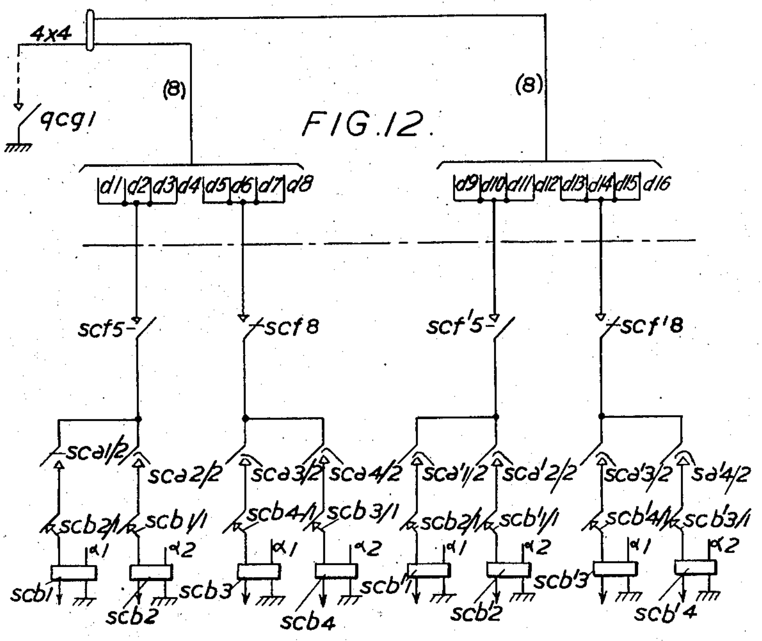
Figure 13:
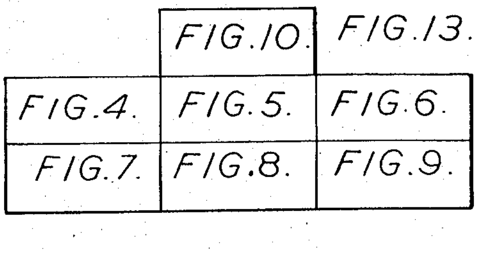
Fig. 13 shows the association of Figs. 4 to 10.

Contact $sca1/2$ (Fig. 12), characterizing the first 26 lines of the first subdivision, and contact $sca2/2$, characterizing the last 26 lines of the same subdivision, are connected to one and the same contact $scf5$. The same applies to contacts $sca3/2$ and $sca4/2$, corresponding to the lines of the second subdivision. Contact $scf5$ is multipled to four wires $d1$ to $d4$, respectively associated with the four second selectors having access to the lines of the first subdivision. Likewise, contact $scf8$ is multipled to four wires $d5$ to $d8$, respectively associated with the four selectors having access to the lines of the second subdivision. Each wire $d1$ to $d8$ is connected to the bank of a first selector. The four *scb'* relays corresponding to the lines served by the second marker are similarly arranged.

The *scb* relay corresponding to the *sca* relay that has operated then energizes over the previously-described circuit.

As has been indicated, relay *scc* has energized in the second connector. It prepares a holding circuit for itself over its front $scc2$. Over its front $scc3$ relay *scc* prepares the energizing circuit of magnets S*ss* and of the associated *scd* relays. There are 26 contacts $scc3$, corresponding to the 26 S*ss* magnets. Over its front $scc4$ relay *scc* prepares the energizing circuit of one of the separating magnets S*sx*/*y*.

Relay *scb* completes the following circuit over its front $scb2$: battery, upper winding of relay *scd*, back $scd'1$, front $scc3$, magnet S*ss*, front $scb2$, wires 600 and 601, distributer RM, front $sm1$ and ground in the line-selecting means. There are 26 contacts $scb2$ per *scb* relay, corresponding to the 26 lines controlled by each.

As pointed out at the beginning of the description, the second connector comprises 26 selection magnets S*ss*, corresponding to the 26 lines of each half of the outgoing lines of each subdivision; there are also two separating magnets S*sx*/*y*, which select one of the above two 26-line series, each magnet S*sx*/*y* being controlled by an *scb* relay in each subdivision.

Separating magnet S*sx* is connected to all the contacts $scb3$ of relays $scb1$ and $scb3$ corresponding to the first 26 lines of each subdivision; likewise, separating magnet S*sy* is connected to the contacts $scb3$ of relays $scb2$ and $scb4$ corresponding to the last 26 lines in each subdivision.

As has already been pointed out, there may be several free outgoing lines in the called group in the subdivision involved. There are two relays *scd* that can energize in series with selection magnets S*ss*. As already mentioned in the course of the description, relays *scd* and *scd'* are given priority at random, a second winding of each of them being looped to resistances of varying value. If it is assumed that relay *scd* energizes, it breaks the energizing circuit of relay *scd'* over its back $scd1$ and makes a choice among the 26 S*ss* magnets, leaving only 13, corresponding for example to the chain of "high" contacts.

Over its front $scb3$ relay *scb* completes the energizing circuit of an S*sx*/*y* magnet: battery, magnet S*sx*, front $scb3$ and $scc4$, ground. Since the *scb* relay that has operated corresponds to the first *sca* relay, magnet S*sx* energizes and corresponds to the 26-line series chosen. Over its front $scb5$ relay *scb* prepares the testing of the line chosen by the marker. Over its front $scb4$ it completes the holding circuit of relay *scc*.

The seized S*ss* magnet completes a holding circuit for itself over its front $sss1$. Over its back $sss1$ it opens the energizing circuit of relays *sce*, which release. Over its front $sss2$ it prepares the energizing circuit of magnet S*y*.

Upon releasing, relays *sce* open the circuit of relay *scc*, which holds over a circuit crossing contacts $scc2$ and $scb4$.

Upon energizing, magnet S*sx* completes, over its front $ssx1$, a holding circuit to the ground across $scf7$ and over its front $ssx2$ prepares the energizing circuit of magnet S*y*.

Upon energizing, relay *scd* opens the energizing circuit of relay *scc*, which does not release immediately, being slightly slow to release, in order to allow magent S*ss* to energize fully. At the end of a certain period of time, this relay releases.

Upon releasing, relay *scc* opens over its front $scc3$ the energizing circuit of the S*ss* magnets that have energized with relay *scd*. Only one of these relays holds over its front contact $sss1$ closest to relay *scd*, back contact $sss2$ of said S*ss* magnet opening the circuits of other S*ss* magnets that may have energized over similar circuits. Relay *scc* completes the following circuit over its back $scc1$: battery, magnet S*y*, front $sss2$ associated with the S*ss* magnet seized among the 26 in parallel, front $ssx2$ corresponding to the S*sx* magnet in parallel with the similar contact corresponding to magnet S*sy*, back $scc1$, front $scd2$, ground. Magnet S*y* energizes regardless of the S*ss* and S*sx*/*y* magnets chosen.

Connecting magnet S*y* connects the incoming wires of switch *ciss* to the position determined by the S*ss* and S*sx* magnets that have operated.

The various operations involved in the hunting for a free line in the called group by the second selector have been described. A description will now be given of the various operations that will lead to the energization of the suitable selection magnets in the first multiselector.

In multiselector MSP1, the P*ss* magnet that has hunted for the calling selector has returned to normal together with its associated *pcd* relay. Relays *pcb*, *pcc*, *pce* are also in home position, while $pcg1$ is energized.

Relay *qcg* completes the following circuit over its front $qcg1$: ground (Fig. 5), front $qcg1$ and $qcd3$, back $qcc1$, wire 503, back $pcb2$, $pcb'2$ and $pcg2/3$, front $pcg1/1$, relay *pce*, back $psx1$, $pss1$ and $pcd'1$, upper winding of relay *pcd*, battery. Relays *pce* energize, as previously indicated on the two chains of high and low contacts of magnets P*ss*, but do not entail the energization of the corresponding *pcd* relays, the resistance of these latter being too low. The energization of the *pce* relays proves that at the moment under consideration no P*ss* or P*sx* magnet is energized.

Over their contacts $pce'1$ and $pce1$, the *pce* relays complete in known fashion the energizing circuit of the *pcc* relay, which pulls up. Over their front $pce2$ and $pce'2$ the *pce* relays complete through the ground on contact $qcg1$ the energizing circuit of relay *pcj*, which pulls up.

Upon energizing, relay *pcj* will control the association of frame MSP2 with frame MSP1 containing the calling selector.

Relay *pcj* completes a holding circuit for itself over its front *pcj*2. Over its front *pcj*3 it prepares the circuit of the final connection. Over its front *pcj*4 it completes the following two circuits:

(1) Ground (Fig. 5), front *qcg*1, circuit already described, wire 503, front *pcj*4, wire 415, front *qss*4 and *qsx*4, wire 416, selection magnets P*ss*, front *pcc*3, back *pcd'*1, upper winding of relay *pcd*, battery;

(2) Circuit already described, front *qss*4 and *qsx*4, magnets P*sx/y*, battery.

The 26 contacts *qss*4 and the two contacts *qsx*4 are respectively connected to the 26 P*ss* magnets and to the two P*sx/y* magnets over these circuits. It follows that the rank of the P*ss* and P*sx* magnets that operate is the same as that of the Q*ss* and Q*sx* magnets that have operated. The P*ss* and P*sx* magnets together therefore characterize the second selector chosen to route the call.

Upon energizing, relay *pss* opens at *pss*1 the energizing circuit of relays *pce*, which release. These latter do not entail the release of relay *pcc*, which holds over the following circuit: ground, back *pcd*2 and *pcd'*2, front *pcg*5 and *pcc*2, relay *pcc*, battery. In combination with contact *psx*2 of the P*sx* magnet that has operated, magnet P*ss* prepares over its front *pss*2 the control circuit of the final connection.

Over its back *pcd*2 relay *pcd* upon energizing opens the holding circuit of relay *pcc*, which releases after a slight delay.

The role will now be considered of marker M in the second phase of the operations that will lead to the connection.

Magnet S*y* completes the following circuit over its front *sy*2: battery (Fig. 9), right-hand winding of relay *pme*, back *pmf*1, wire 604 (Fig. 6), front *scf*2 and *sy*2, ground. There is one wire 604 corresponding to the *p* frames of second selectors that can be located in the second stage of the group-selecting means under consideration. In the example described it has been assumed that relay *pme*, having its left-hand winding short-circuited, is slow to operate and therefore does not energize immediately. Over its front *sy*3, magnet S*y* completes the test circuit of the line chosen by the marker. The making of this test requires connecting the marker to a predetermined line among the 104 lines outgoing from the multiselector involved. The selection of one out of these 104 lines is made in two stages: the contacts *scb*5 respectively associated with the first two *scb* relays are designed to make the choice in the first subdivision; likewise, the right-hand contacts *scb*5 respectively associated with the last two *scb* relays are designed to select the second subdivision. The selection of a predetermined line from among the 52 of one section is effected by switch *ciss*.

Marker M' serves second selectors having access to the same outgoing lines as the second selectors controlled by marker M. The second marker's test circuit, consisting of wire 603' and front contact *scf'*4, therefore is connected to the test circuit of the first marker. The test circuit is then as follows: battery (Fig. 6) in the line-selecting means, resistance R*e*62, distributor RP1, test wire *t* of the second selector, contact *yt*1, front *scb*5, *sy*3 and *scf*4, wire 603 (Fig. 9), windings in series of relay *pmc*, ground. This relay *pmc* energizes and tests the outgoing second line. Over its front *pmc*1 it prepares the energizing circuit of relay *pmf*. Over its front *pmc*2 it drops the test potential on the outgoing line by switching in the low-resistance right-hand winding of differential relay *pmd*.

It will be assumed throughout what follows that the line selected is tested only by the marker under consideration. Under these conditions, relay *pmd*, being balanced, releases. Upon releasing, relay *pmd* completes the following circuit over its back *pmd*1: battery, relay *pmf*, front *pmc*1, back *pmd*1, wire 902 (Figs. 8 and 7), front *pma*10, *pry*4, wire 405, front *pch*5, ground. Relay *pmf* energizes. This is the relay that will control the connection.

Over its back *pmf*1 relay *pmf* breaks the energizing circuit of relay *pme*, which has not had time to energize in the case under consideration. Over its front *pmf*2 it completes the following circuit: ground (Fig. 7), front *pmf*2 and *pma*5, wire 403, relay *pch*1, battery. This circuit provides a holding for relay *pch*1. Over its front *pmf*3 relay *pmf* completes the following energizing circuit for the first connecting magnet: battery (Fig. 4), lower winding of magnet P*v*, contact *xv* of switch *cisp*1, wire 404, front *pma*6, *pmf*3, *pma*11, wire 406, front *pcg*1/2, *pcj*3, *psx*2, *pss*2, ground.

Connecting magnet P*v* energizes in order to cause the connection of the first selector to the line connected to the chosen second selector. Over its front *pv*1 magnet P*v* completes a holding circuit for itself over its two windings in series through the ground on the *t* wire. Over its back *pv*2 it makes a break between connector CSP1 and test resistance R*t*. Over its back *pv*4 it makes a break in the ground on the *a* wire across a resistance R*m* in order not to interfere with the conversation. Over its back *pv*5 it makes a break in the circuit of the *c* wire, in order to tell the common control members of the first selector that their functions are over. Over its front *pv*2 it applies a ground to the *t* wire of selector SP and completes the following circuit: battery (Fig. 6), lower winding of second connecting magnet S*v*, back *sv*5, wire *t* (Fig. 5), distributer RP2, wire *t* (Fig. 4), contact of first selector SP, front *pv*2, ground on wire *t*. Magnet S*v* energizes and causes the second selector to be connected to the chosen outgoing line.

Via its front *sv*1 magnet S*v* completes a holding circuit for itself over its two windings in series. Over its back *sv*2 it opens the energizing circuit of relay *qca*, which releases. Over its front *sv*4 it applies a ground to the outgoing wire of second selector SS and, over a circuit already described, short-circuits relay *pmc* of the marker (Fig. 9), as also the right-hand winding of relay *pmd*, which energizes over its left-hand winding. This relay *pmc* releases. Over its back *sv*3 (Fig. 6) magnet S*v* makes a break in the ground on the *a* wire across a resistance R*m''* in order not to interfere with the conversation. Over its back *sv*5 magnet S*v* breaks its initial energizing circuit.

The various functions of the common control members in the putting through of the call are over, and an explanation will now be given of how these members release.

Upon releasing, relay *qca* (Fig. 5) opens over its front *qca*2 the energizing circuit of relay *qcb*, which releases. Over its front *qca*3 it opens the holding circuit of magnet Q*sx*, which releases.

Upon energizing, relay *qcb* opens over its front *qcb*2 the energizing circuit of magnet Q*ss*, which releases, as also the associated *qcd* relay.

Figure 5:
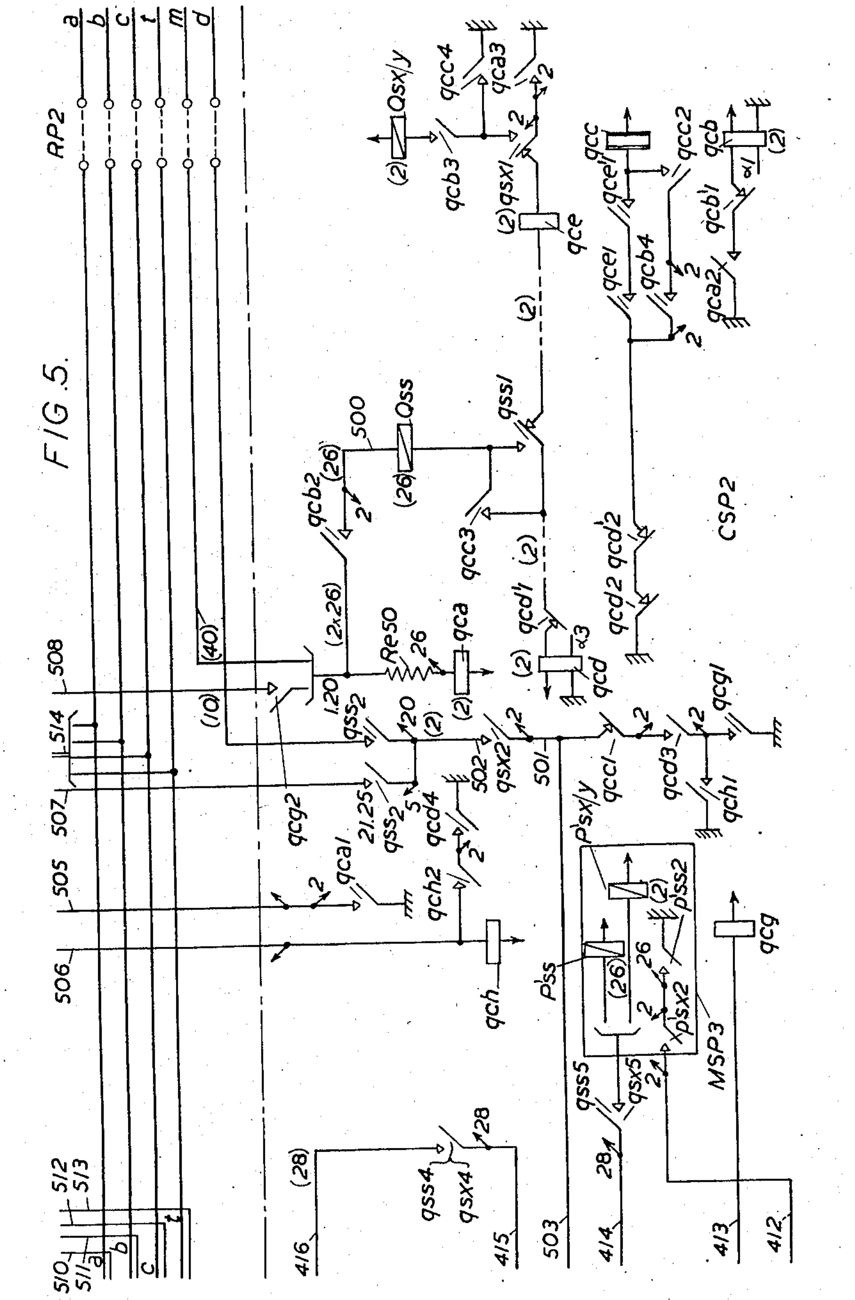

Upon releasing, relay *pmc* of marker M opens over its front *pmc*1 the energizing circuit of relay *pmf*, which releases in turn. Upon releasing, relay *pmf* again completes over its front *pmf*1 the energizing circuit of relay *pme*. The latter, slow to operate, does not energize at the instant under consideration. Over its front *pmf*2 relay *pmf* removes the holding ground of relay *pch*1, which releases (Fig. 5). Over its front *pmf*3 (Fig. 7) it opens the initial energizing circuit of magnet P*v* (Fig. 4).

Upon releasing, relay *pch*1 opens over its contact *pch*1/1 the holding circuit of magnet P*x*, which releases. Over its front *pch*5 it removes the holding ground of the receiver, thus causing all the receiver relays still energized to release. Relay *prl* had held over the following circuit: ground, left-hand winding of relay *prl*, front *prl*2, resistance R*e*72, front *pra*1 and *prx*3, relay *prf*, battery. Similar holding circuits are likewise completed for relay *prl* through relays *prx, pry, pre.* The resistance of the left-hand winding of relay *prl* is such that the currents flowing through relays *pre, prx, prf* and *pry* do not prevent these relays from releasing. When the various relays *pre, prf, prx* and *pry* have released, the various holding circuits of relay *prl* are opened and this relay, further having its right-hand winding opened at *pch*1/3, releases, thus controlling the full release of the receiver. The removal of the ground from wire 405 (Fig. 7) also causes the release of relays *pmx, pmy* and *pmz* in the marker, as also the release of relay *pma*2. The same applies to relay *pmd.* Upon releasing, relay *pma* causes the sequence of operations involved in the release of incoming connector CSP1.

Over its front *pma*7 associated with front *px*2 of magnet P*x*, also restored to normal, relay *pma* opens the energizing circuit of relays *pcg*1 and *qcg*, both of which release.

Magnet P*x*, through the opening of its front *px*3 and *px*4, removes the connection between the line wires and the receiver. Over its front *px*1 it removes the holding ground from relay *pca*, which releases. Over its front *pcg*1/4 relay *pcg*1 upon releasing opens the holding circuit of relay *pcj*, which releases. Over its front *pcj*4 relay *pcj* upon releasing opens the energizing circuits of magnets P*ss* and P*sx*, both of which release, as does also relay *pcd* associated with magnet P*ss*. Incoming connector CSP1 is thus fully released.

Upon releasing, relay *qcg* opens over its front *qcg*1 associated with contacts *qss*2 and *qsx*2 of magnets Q*ss* and Q*sx*, restored to normal, the energizing circuit of relay *scb*, which releases.

Upon releasing, relay *scb* opens over its front *scb*2 the energizing circuit of magnet S*ss* and of its associated relay *scd*, both of which release. Over its front *scb*3 it opens the holding circuit of magnet S*sx*, which releases.

Upon releasing, marker relays *pmx, pmy, pmz* cause the release of relay *pmb* over their front *pmx*5, *pmy*5, *pmz*2 (Fig. 8). Over its front *pmz*1 relay *pmz* opens the energizing circuit of relay *sm* (Fig. 6), which releases.

Upon releasing, relay *sm* removes the ground from the energizing circuit of relay *sca*, which releases. Over its front *sca*3 relay *sca* upon releasing causes the release of relay *scf*.

Upon releasing, magnets S*ss* and S*sx* have opened at *sss*2 and *ssx*2 the energizing circuit of magnet S*y*. This magnet releases and opens at *sy*2 the energizing circuit of slow relay *pme*, which has not had time to energize.

Thus, the chain of common control members, having allowed the connection of the calling first selector to the second selector and to the chosen line of the called group, it releases, only connecting magnets P*v* and S*v* remaining seized.

Feeding bridge AL is connected to the line-selecting means over line wires *a* and *b*, indicated by heavy dashes.

When the connection established has ended, the ground is removed from the *t* wire by feeding bridge AL, magnet P*v* releasing, causing at *pv*2 the release of second connecting magnet S*v*.

The various special cases that can be encountered in the routing of a call through the group-selecting means will now be discussed.

First the case will be examined where the calling selector belongs to the second frame. As follows from the foregoing explanations, the relays and magnet that energize, *pca, pcb* and P*x*, are the same that operated in the case just described. Receiver RSP1, like before, receives from the register the call number of the called line group. Relay *pma*1 therefore also operates; but, since the calling selector forms part of the 17 positions corresponding to frame No. 2 and reached over contact *xg* of individual switch *cisp*1, only relay *qcg* energizes in outgoing connector CSP2 when the connection of the receiver and the marker is effected. Relay *pcg*1 does not operate, and it prevents at *pcg*1/4 the energization of relay *pcj*. The operations then develop according to the known method described, with the sole difference that magnets P*ss* and P*sx/y*, having their circuit opened at *pcj*4, do not operate; magnets Q*ss* and Q*sx/y*, which have already been used for positioning the outgoing connector, are used over again for the first selector. Said outgoing connector and said first selector being on one and the same frame, they are in fact controlled by the same selection magnets. The final connecting circuit is controlled by the ground applied to magnet P*v*, over a circuit already described, by back pcj1/2.

It will now be assumed that the calling selector is in the second half of multiselector MSP1. As previously explained, the incoming connector uses a second bar controlled by magnet P*x'* to connect this calling selector to second receiver RSP2. Individual switch *cisp'*1 is identical with switch *cisp*1. Further, receiver RSP2 is identical with receiver RSP1 and it comprises the same means.

However, the *pca* relay that energizes is the second one, the same applying to its corresponding *pcb* relay. The operations develop then according to a known method up to the energization of magnet P*x'*, which is done by a circuit in parallel with the energizing circuit of magnet P*x*, passing through the contact *pcb'*5 associated with the second *pcb* relay. In the incoming connector, however, it is relay *pch*2 that energizes on the ground of the *t* wire sent by contact *x't* of individual switch *cisp'*1.

Over its contact *pch*2/5, not shown but similar to contact *pch*1/5, relay *pch*2 applies a ground to the energizing circuit of relay *pma*2 associated with receiver RSP2.

Over its front *pma*7 the *pma* relay energized completes the following circuit: ground, front *pma*7, wire 408' in the second receiver, contact *x'g* of switch *cisp'*1, relays *pcg*2 and *qcg* in series, both of which energize. The operations then develop according to a method similar to the one described in the first example, the calling selector belonging to the first frame; however, the energizing ground of magnet P*v* is sent by front *pcg*2/3 through the medium of second receiver RSP2.

It will now be assumed that the calling selector is on the third frame of the first subdivision involved. It has already been explained that in this case receiver RSP2 served calls coming from this frame as also those coming from selectors of the second half of the first frame. The same as in MSP1, switch *cisp'*1 comprises a contact *x'g* giving access to 25 positions. The first 8 positions reached via contact *x'g*, corresponding to the 8 selectors of the second half of the first frame, are connected to a relay *pcg*2, the other 17, corresponding to the 17 selectors of the third frame, being connected to a relay *pck*. Relay *qcg* energizes in series with relay *pck*. By energizing, relay *pck* tells outgoing connector CSP2 that the calling selector belongs to the third frame. The operations then develop according to a method already described, up to the energization of a magnet Q*ss* and of a magnet Q*sx* in the outgoing connector.

Upon energizing, relay *qcg* has closed its front *qcg*1, which will control in the third frame the energization of a magnet P'*ss* and of a magnet P'*sx/y*, corresponding to magnets Q*ss* and Q*sx/y*, over the following circuit: ground (Fig. 6), front *qcg*1 and *qcd*3, back *qcc*1, wire 503, front *pck*2, wire 414, front *qss*5 and *qsx*5, magnets P'*ss* or P'*sx/y*, battery. Out of the 28 contacts *qss*5 and *qsx*5, the 26 contacts *qss*5 are connected respectively to the 26 magnets P'*ss* of the third frame and the two contacts *qsx*5 are connected respectively to magnets P'*sx/y* of the same frame. By energizing, magnets P'*ss* and P'*sx* together characterize the second selector chosen for routing the call.

When the final connection has been made, the ground controlling the energization of connecting magnet P'*v* of the third frame is sent through front *p'sx*2 and *p'ss*2 (Fig. 5) of the selection magnets of said third frame and sent to said connecting magnet P'*v* via front *pck*1 and back *pcg*2/2 through second receiver RSP2.

It will not be assumed that a plurality of selectors are calling simultaneously. The system is then designed to serve these calls in succession. All these calls are translated into the energization of one or more relays *pca*. It will be noted in this connection that a relay *pca* remains energized as long as a first selector out of the 25 corresponding to it has not been served.

A first choice is made by relays *pcb*. In fact, each *pcb* relay comprises a second winding, which, looped to cyclically varying resistances, imposes a certain delay in energizing on one of these relays, as has already been explained. One of the two *pcb* relays therefore energizes before the other and upon energizing opens at *pcb*1 the energizing circuit of the one slower to operate. If relay *pcb* is the one that operates, the calls given priority will be those terminating at the selectors of the second frame or at the selectors of the first half of the first frame. Those terminating at the selectors of the second half of the first frame and of the third frame will be held waiting.

Out of the 24 first selectors thus determined, still many can be brought into calling position. A new choice is made by the two *pcd* relays, which also comprise a second winding giving one of them a certain priority in energizing. If relay *pcd* receives priority in energizing, the calls from the selectors corresponding to high magnets P*ss* will be given priority. The calling selector that will be served the first is then determined by magnet P*ss*, which, after the opening of contacts *pcc*3, will hold over its front *pss*1, it back *pss*1 preventing the other magnets from holding over similar circuits. Finally, only one selection magnet P*ss* can hold, and connector CSP1 connects itself to the calling selector SP thus chosen. When the routing of the call is over, all the relays and magnets of connector CSP1 release according to a method already described, with the exception of the *pca* relay or relays corresponding to calls held waiting. These calls are then handled in the same manner.

If connector CSP1 is in the process of routing a call and another selector is brought into calling position before the routing of said call has ended, the various operations follow one another like in the preceding case and the connector will handle the two calls in succession. Of course, priority is not necessarily given to the first calling selector, for it depends only on delay devices added to the two *pcb* relays and to the two *pcd* relays and on the arrangement of the chains of back contacts *pss*. As indicated in the above-mentioned patent application, the priority given to one of the *pcb* or *pcd* relays is only a priority given at random. On the other hand, priority is given to the P*ss* magnet located the nearest to relay *pcd* in the chain of back contacts *pss*1.

If receiver RSP1 (Fig. 7), designed to serve connector CSP1, is not fully released following the routing of a preceding call, relay *prl* is energized and contact *prl*1 open. In connector CSP1 (Fig. 4) relay *pcb* and hence magnet P*x* cannot operate and the sequence of operations cannot occur; the call involved is then held waiting until receiver RSP1 again becomes available. In practice, the holding time of the receiver is very short and the call is not held waiting too long.

If marker M, designed to serve receiver RSP1, is busy, that is to say, if it is engaged with another receiver, one of back contacts *pma*2/2 or *pma*3/2 or *pma*4/2 (Fig. 7) is open, as also contact *pmb*1, and the sequence of operations cannot occur. Like in the preceding case, the call involved is held waiting until said marker again becomes available. If, for any reason whatever, the marker is slow in being released, the register cannot send the next selective combinations, and it releases after a certain time lag according to a known method.

As follows from the explanations given at the beginning of the present description, marker M can serve four receivers RSP1 . . . RSP4, the last two receivers serving calls coming from the second first subdivision. Each of the receivers (Fig. 7) comprises a relay *pma* comprising a second winding, which acts upon the operating time of said relays *pma*. The four *pma* relays then cut themselves off mutually by pairs. The two relays *pma*1 and *pma*2 of the first subdivision cut each other off, in accordance with the priority given, over their back *pma*1/1 or *pma*2/1. The same applies to relays *pma*3 and *pma*4 of the second subdivision, over their back *pma*3/1 and *pma*4/1. Likewise, each of the two relays of each subdivision has a rank-2 back contact such as *pma*1/2 . . . *pma*4/2 to break the circuits of the *pma* relays of the other subdivision.

It has been assumed in the description of the general case that only the outgoing lines of the first second subdivision were brought into calling position in outgoing connector CSP2. Now, it may happen that the outgoing lines of the second second subdivision will also be brought into calling position in said outgoing connector. In that case, four relays *sca* can energize simultaneously, since the free lines in the called group can be distributed between the two halves of each subdivision. It will be assumed that these four relays *sca* actually do energize.

Figure 6:
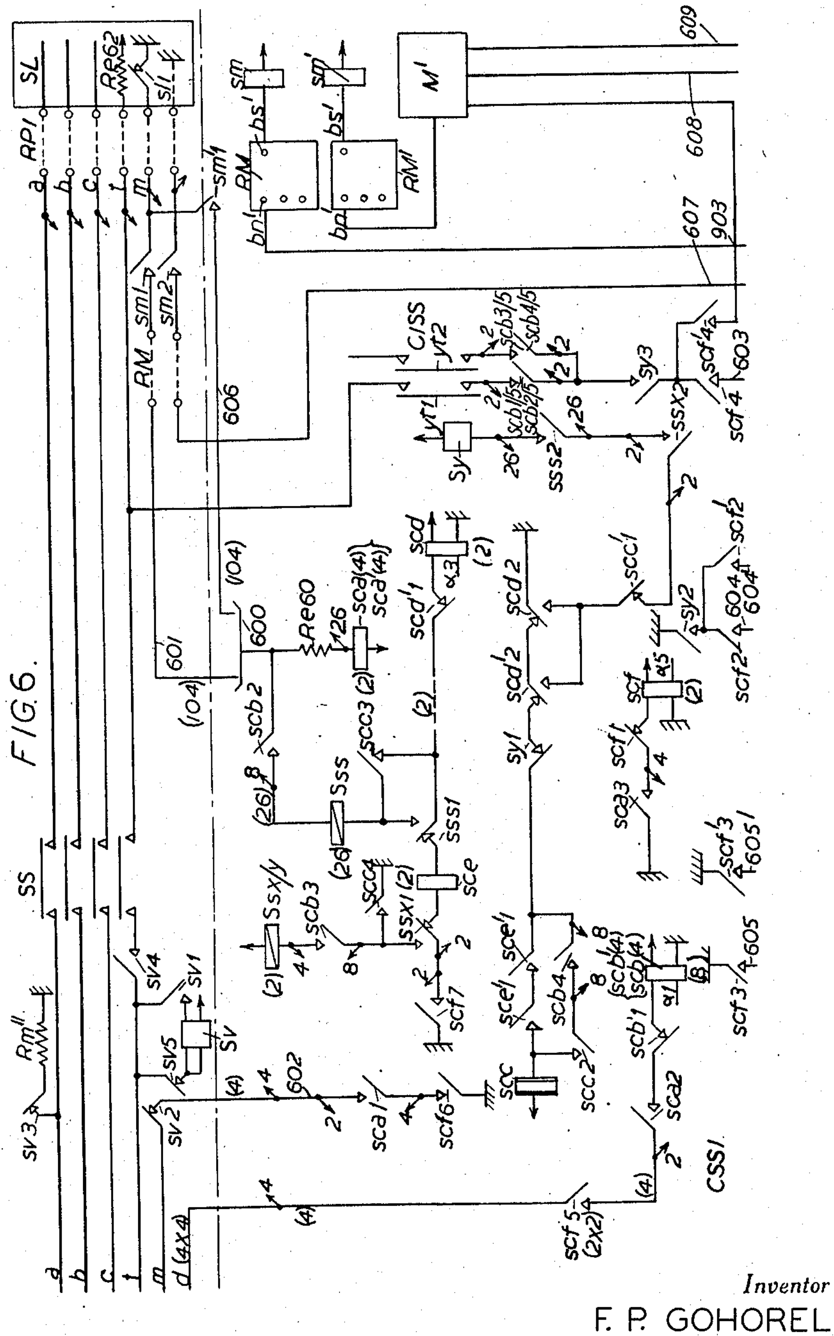
Fig. 6 is a schematic of a second selector and of the associated connector.
Figure 11:
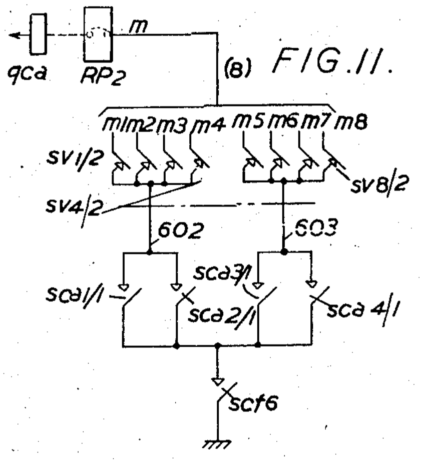
Figs. 11 and 12 are detailed schematics of two portions of Fig. 6.

Marker M alone being assumed in operation, the relay *scf* corresponding to it energizes contacts *sca*3 (Fig. 6). As has been described, relay *scf* completes the energizing circuit of relay *pme*, which, being slow to operate, does not energize at the moment under consideration, relay *scf* further preparing the connection of the test circuit to marker M. Over its front *scf*6 relay *scf* completes the circuit that will bring into calling position all the second selectors belonging to the two second subdivisions and capable of routing the call. In the case under consideration, the four contacts *sca*1 of the four relays *sca* are closed (Fig. 11).

As has been indicated, the first 20 wires *m* (Fig. 5) are connected to a relay *qca* through resistance R*e*50. The same applies to the other 20 wires *m*, connected to a second relay *qca*. As soon as relay *scf* has operated, it completes 8 similar circuits for the 4 second selectors of the first subdivision and for the 4 selectors of the second subdivision over wires *m*1 to *m*8 (Fig. 11): ground, front *scf*6, front *sca*1 of an *sca* relay that has operated, wire 602 for example, back *sv*2, wire *m*1, distributor RP2, resistance R*e*50, relay *qca*, battery. The two *qca* relays belonging to the first first subdivision energize.

It will be noted that the other *qca* relays, in the other first subdivision of the group-selecting means, also energize. As explained, relay *qcg* of the outgoing connector of the subdivision under consideration energized upon the seizure of marker M by receiver RSP1 and prepared over its front *qcg*1 the energizing circuit of the *scb* relay corresponding to the *sca* relays energized. The *qcg* relay of the other subdivision has remained unoperated. Over their front *qca*2 the two *qca* relays tend to cause the energization of the two *qcb* relays. These two relays are slowed with respect to each other cyclically by a device already described. One alone of the two energizes, for example *qcb*, less slow to operate than *qcb'*, whose energizing circuit it opens over its back *qcb*1. The *qcb* relay that energizes thus chooses a group of 20 lines terminating at the second selectors.

In the description that follows it will be assumed that the first second subdivision is chosen.

In the outgoing connector the operations then develop according to the normal method already described and the energization of the two magnets Q*ss* and Q*sx/y* causes the connection of the outgoing connector to the second selector that is going to route the call.

The connector CSS1 associated with the chosen second selector must then hunt for a free line in the group dialed. Over the *d* wire, front *qcg*1 applies a ground to the *d* wire corresponding to the chosen second selector. This ground is applied through contact *scf*5 and contacts *sca*2 of relays *sca* to two relays *scb*. It has been explained that the 4 relays *sca* of the second connector have operated, but, as has been indicated, the operations that have taken place in the first outgoing connector have determined the choice of the first subdivision for the routing of the call. The two relays *scb* respectively corresponding to the first 26 lines and to the last 26 lines of the first subdivision are provided with a device already described that causes a difference in their operating time. The *scb* relay that energizes opens the energizing circuit of the other *scb* relay; if it is the first, it will determine the choice of a free line in the called group from among the first 26 outgoing lines of the first second-selector subdivision.

The determination of outgoing line that will route the call is made according to a method similar to the one already described for the general case. The *sca* relays that have not been used remain energized until the release of the common members when the connection has been made.

It may also happen that a call will be routed through the group-selecting means controlled by marker M'. In this group-selecting means SG', the operations ending in the marking of the free outgoing lines of the group-selecting means are identical with those already described for group-selecting means SG, and marker M' causes through a distributer RM' the energization of a relay *sm'* corresponding to the group dialed. The outgoing lines of group-selecting means SG and of means SG' are multiplied to one another, and marker M' controls, as already described, the 20 second subdivisions of means SG'. It may therefore happen that the same free outgoing lines will be marked calling at the same time by marker M and by marker M' owing to the fact each outgoing line is multiplied to all the group-selecting means. Front *sm*1 of relay *sm* and of relay *sm'* then complete the circuits causing the energization of at least one *sca* relay and at least one *sca'* relay. Over their front *sca*3 and *sca'*3 these two relays respectively complete the energizing circuits of relays *scf* and *scf'*, respectively corresponding to marker M and marker M'. Only one of these two relays energizes according to a certain order of priority already mentioned in a patent application given as a reference. If relay *scf* energizes first, the operations develop according to a method already explained, for marker M. If relay *scf'* energizes first, the operations in second connector CSS1 will end by bringing into calling position, in outgoing connector CSP2 of group-selecting means SG' controlled by marker M', the second selectors of the second subdivisions of group-selecting means SG', which selectors are controlled by marker M'.

In fact, it has already been explained that for traffic reasons it was deemed preferable to have one marker control, in each second subdivision, 4 out of the 8 selectors, the other four selectors of each subdivision being controlled by another marker, marker M', the 8 selectors of each subdivision each having access to 52 outgoing lines.

The result is that the ten second multiselectors of the second selection stage are common to the two adjacent group-selecting means SG and SG'. Consequently, the connection of the outgoing lines of the first stage, controlled by marker M', to the second selectors of the second stage, controlled by said marker M', is made absolutely in the same manner as the connection already described of the outgoing lines of the first stage of group-selecting means SG to the second selectors controlled by marker M.

Therefore, relay *scf'* upon energizing gives priority to the calls controlled by marker M', and the operations then proceed in the first stage of group-selecting means SG' according to the method described in the general case for a call routed through means SG.

If the outgoing connector corresponding to the calling first selector has no free access to a free second selector itself having access to a line in the called group, the call is routed through an overflow selector, as will be pointed out.

As previously indicated, each first subdivision gives access to 52 outgoing lines. Only 40 lines are used for the normal routing of calls, the next 10 being reserved for overflow. Further, the second selectors of the second subdivisions having access to free lines to the group dialed are brought into calling position not only in the first first subdivision considered up to this point but also in the other first subdivision.

Therefore, if the 40 outgoing lines of the first first subdivision have no free access to the line or lines in calling position, the corresponding second subdivision cannot be brought into calling position in outgoing connector CSP2 but they can in outgoing connector CSP5 (Fig. 3) of the second first subdivision.

The distribution of the selectors and of the outgoing lines of the second frame of the second first subdivision is identical with that of the second frame of the first first subdivision. Outgoing connector CSP5, which acts as an overflow connector, brings into calling position all the available overflow selectors. Outgoing connector CSP2 then hunts for an overflow selector in calling position. Connector CSP5 thereupon hunts on the banks of the chosen overflow selector for a second selector in calling position. The connection between the feeding bridge and the outgoing line is then made through a first selector, an overflow selector and a second selector.

The detailed operations that occur in the case of overflow will now be described. When outgoing connector CSP2 cannot receive calls from calling second selectors, the circuit of its *m* wire (Figs. 5 and 6) is opened by back *sv*2 and its relays *qca* cannot energize. The only relay energized in this outgoing connector is relay *qcg*, which energized when marker M was seized by receiver RSP1. In outgoing connector CSP5, which acts as an overflow connector, the operations develop according to a known method, but relay *qcg* of this connector is not energized, the second first subdivision not being in calling position.

Figure 10:
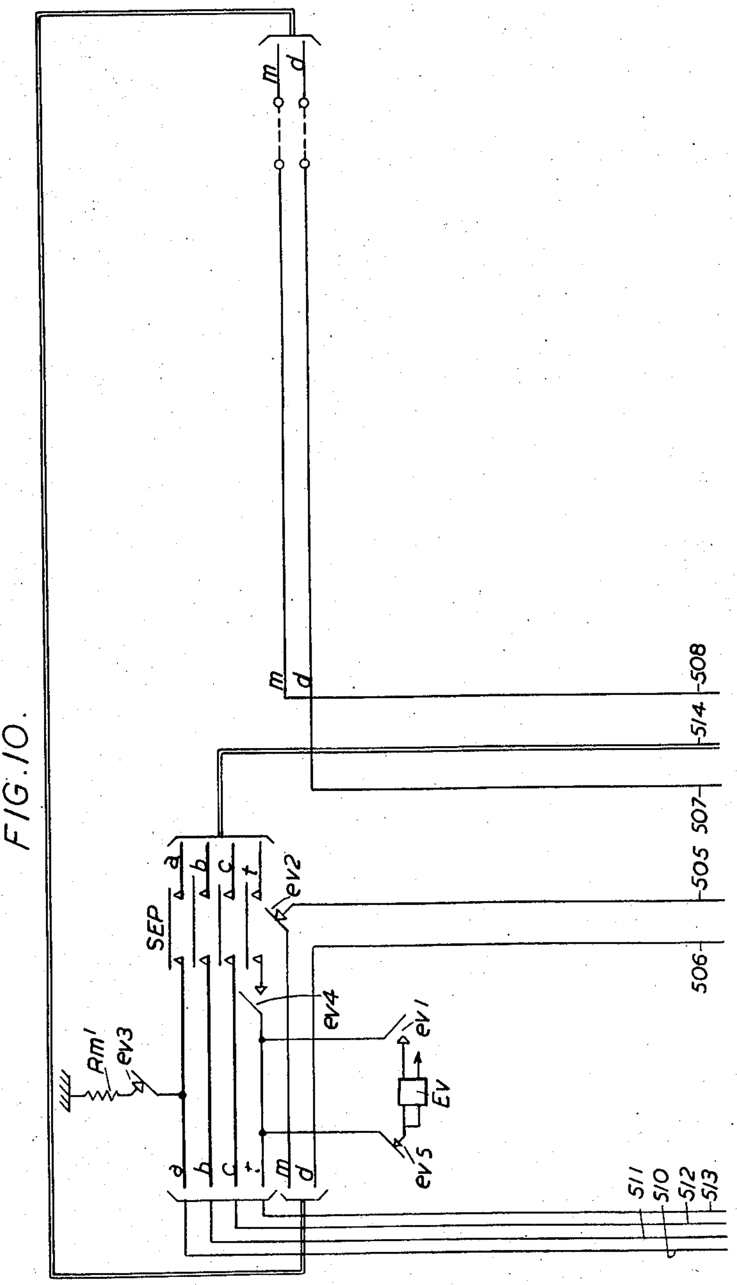
Fig. 10 is a schematic of the first selector used as an overflow selector.

At least one *qca* relay of connector CSP5 is energized, which in known fashion causes the energization of relays *qcb*, *qce* and *qcc*. The energizing circuits of magnets Q*ss* and of the associated relays *qcd* are thus completed. The energization of a *qcd* relay by opening the energizing circuit of relay *qcc* causes the latter to release. One Q*ss* magnet holds. Relay *qcg* being in normal position, the circuit controlling the hunting in the second stage cannot be completed. However, in this overflow connector CSP5, relay *qca* upon energizing has completed the following circuit over its front *qca*1: ground (Fig. 5), front *qca*1, wire 505 (Fig. 10), back *ev*2, wire *m* (Fig. 5), wire 508, front *qcg*2 in connector CSP2, resistance Re50, relay *qca*, battery. One of the two *qca* relays energizes, depending on the 26-wire series comprising the overflow line involved. It is assumed that only one *qca* relay energizes. The operations that would develop if both *qca* relays energized simultaneously have already been described.

In connector CSP2 the operations involved in the hunting for an overflow selector develop according to a method already described in the general case, up to the energization of the two selection magnets Q*ss* and Q*sx*. Outgoing connector relay *qcg* completes the following circuit over its front *qcg*1: ground, front *qcg*1 and *qcd*3, back *qcc*1, front *qsx*2, wire 502 multipled to front *qss*2 of magnets Q*ss*21 to Q*ss*25 corresponding to the overflow lines, wire 507 (Fig. 10), wire *d*, wire 506 (Fig. 5), relay *qch*, battery. Relay *qch* energizes in the overflow connector.

This overflow-connector relay *qch* performs the same function as outgoing-connector relay *qcg* in the general case; in fact, it grounds the *d* wire terminating at the chosen second selector, this causing the hunting in second connector CSS1 for a free line in the called group. Over its front *qch*2 relay *qch* completes a holding circuit for itself through front *qcd*4. The operations then develop according to a method already described, up to the connection. The energization of relay *pmf* causes the energization of first magnet P*v*. Over its front *pv*2 magnet P*v* completes the following circuit: ground on the *t* wire (Fig. 4), front *pv*2, contact of first selector SP, wire *t* (Fig. 5), wire 513 (Fig. 10) back *ev*5, lower winding of magnet E*v*, battery. Overflow-selector magnet E*v* energizes.

Over its front *ev*1 magnet E*v* completes a holding circuit for itself to its two windings in series. Over its back *ev*2 it opens the circuit of the *m* wire of the overflow selector, this allowing bringing into calling position in outgoing-connector CSP2 all available overflow selectors. Over its back *ev*3 it removes the ground from the *a* wire across resistance R*m*′ in order not to interfere with the conversation. Over its front *ev*5 magnet E*v* opens its initial energizing circuit. Over its front *ev*4 it completes the following circuit: ground on the *t* wire, front *ev*4, contact of first overflow selector SEP (Fig. 10), wire *t*, cable 514 (Fig. 5), wire *t*, distributer RP2, wire *t* (Fig. 6), back *sv*5, lower winding of second connecting magnet S*v*, battery. Magnet S*v* energizes.

Upon energizing, magnet S*v* completes the connection of the calling first selector SP to the chosen outgoing lines through overflow selector SEP.

Second magnet S*v* then releases according to a method already described the operations involved in the release of the common members by causing test relay *pmc* to fall back.

Over its back *ev*2 overflow magnet E*v* causes the release of relay *qca* of outgoing connector CSP2.

The release of all the member that have aided in the connection is then made according to a method already described, magnet E*v* causing the release of outgoing connector CSP2 and magnet S*v* causing the release of the overflow connector.

The outgoing lines of the odd-rank selecting means, designated SG, SG″ and SG″″, of a group-selecting set, are multipled to one another. It may therefore happen that the outgoing line of a called group will be tested simultaneously by a marker M and a marker M″. As has been explained, marker M′ cannot act in this case, because it controls half of the second selectors of group-selecting means SG and because then the choice of the marker is made by the energization of a relay *scf* or *scf*′.

The right-hand winding of relay *pmd* (Fig. 9) is shunted by the similar winding of relay *pmd* of the other marker; the flux produced in said right-hand winding is not sufficient to offset the action of the flux in the left-hand winding, and relay *pmd* remains energized. Relay *pmf* cannot operate, owning to the opening of contact *pmd*1. Relay *pme*, slow to operate and the energizing circuit of which is completed upon the energization of magnet S*y*, ends by energizing. The same applies to the other marker, but the operating lags of these two relays *pme* are not strictly identical, and one of these relays energizes before the other. Throughout what follows it will be assumed that relay *pme* of marker M energizes before the one of the other marker. Upon energizing, relay *pme* opens over its back *pme*2 the short-circuit of its left-hand winding. Over its back *pme*1 it opens the energizing circuits of relays *pmz* and *sm*.

Relay *sm* causes the release of all the relays of the second connector and of the outgoing first connector. All the operations following the marking are thus cancelled. Relay *pme* releases when its energizing circuit is opened at *scf*2; it re-closes its back *pme*1, this allowing the re-energization of relay *sm* and the choosing of another free line in the called group according to the same method previously described.

It may happen that the called group can be reached over an alternative route. The operations that allow connecting the calling selector to a chosen free line if the called group contains free lines have already been described. In that case, a marker relay *pmg* is short-circuited over front *scf*3 in order to prevent its energization. On the other hand, if the called group contains no free line, there is no short-circuiting and, upon energizing, relay *sm* completes the following circuit over its front *sm*2: ground (Fig. 6), distributer RP1, front *sm*2, marking distributer RM, wire 607 (Fig. 9), back *pmf*6, upper winding of relay *pmg*, resistance R*e*90, battery. There is only one *pmg* relay and only one wire 607 in the marker, this wire 607 being multipled to all the contacts such as *sm*2. Relay *pmg* comprising a short-circuited second winding, it is slow to operate and does not energize at the instant under consideration.

This lag is profited from in case a line of the called group is released, bringing about, as has been described, the energization of a relay *sca* and then of a relay *scf*. Over its front *scf*3 (Fig. 6) relay *scf* would short-circuit the upper winding of relay *pmg*, which would no longer be able to energize. The operations would then develop according to the method described for the general case.

If no line of the dialed group is released, relay *pmg* ends by energizing. Over its back *pmg*1 it opens the short-circuit of its lower winding, this making it fast to release. Over its front *pmg*2 relay *pmg* causes the sending of a battery polarity to the register over the following circuit: battery (Fig. 7), resistance *Re*71, front *pmg*2 and *pma*4, front *pry*2, wire 402, front *pch*1/4, *px*4 and *xb*, wire *b* to the register. The register is thus warned of the existence of an alternative route. The register releases the whole chain of members seized and recommences the whole cycle of operations to route the call over that alternative route. If there is no alternative route and the called line group contains no free line, a timing device in the register sends the calling subscriber the busy tone.

The case will now be discussed where there would be 6 first multi-selectors divided up into three subdivisions.

As has already been explained (Fig. 2), the first frame of the first and third subdivisions carries the incoming connectors. Each of these connectors comprises two individual switches such as those described in the general case, which connect the calling selectors to the various receivers. The first individual switch of the first frame of the first subdivision, controlled by magnet P*x*, connects to receiver RSP1 the selectors belonging to the second frame of the first subdivision and to the first half of the first frame of said subdivision. The second individual switch of the this first frame, controlled by connecting magnet P*x*′, connects to receiver RSP2 the calling selectors belonging to the second half of the first frame of the first subdivision and to the first frame of the second subdivision. Likewise, in the third subdivision, the first individual switch of the incoming connector, located in the first frame, connects to receiver RSP3 the selectors belonging to the second frame of the third subdivision and to the first half of the first frame of said subdivision. The second individual switch, controlled by a magnet similar to P*x*′, connects to receiver RSP4 the selectors of the second half of the first frame of the third subdivision and those of the second frame of the second subdivision.

In each subdivision, moreover, frames No. 2, MSP2, MSP4 and MSP6 carry an outgoing connector.

The incoming and outgoing connectors used in the division into three subdivisions perform functions identical with those performed by these same members in the general case previously described.

When the calling selector belongs to any of the first-subdivision frames, the operations develop according to a method identical with the one described in the general case, where it was assumed that the calling selector belonged to the first or to the second frame; the same applies if it belongs to the third subdivision. It will now be assumed that the calling selector belongs to the first frame of the second subdivision.

As has already been pointed out, individual switch *cisp'1* of the incoming connector associated with the first frame of the first subdivision is the one that operates, controlled by magnet P*x'*, to connect said calling selector to receiver RSP2. As has been described, contact *x'g* of switch *cisp'1* (Fig. 4) has access to 25 positions, the first 8 being connected to the 8 selectors of the second half of the first frame of the first subdivision, the other 17 being connected to the 17 selectors of the first frame of the second first subdivision.

Since second receiver RSP2 must operate for calls sent by the selectors of frame MSP3, marker relay *pma2* has energized in the manner described and the following circuit is completed through contact *pma7* (Fig. 7): ground, front *pma7* in receiver RSP2, wire 408', contact *x'g* of switch *cisp'1*, resistance R*e41*, relay *qcg* in outgoing connector CSP4 of the second subdivision. Relay *qcd* therefore energizes in this connector. It will be noted that relay *pck* does not operate; when dealing with this division into three subdivisions, the connection represented by an unbroken line will be eliminated and replaced with the one represented by a broken line, terminating at resistance R*e41*, the value of which is equal to the resistance offered by relay *pck*.

From this stage onward, the operations develop according to the method described in the general case. At the moment of the final connection, outgoing connector CSP4, having been warned according to a method already described that the calling selector is comprised in multiselector MSP3, sends to the selection magnets of said multiselector the position of its magnets Q*ss* and Q*sx/y* energized. The energizing of the connecting magnet of multiselector MSP3 is then done according to a method already described.

Upon the release, the common members are released according to the normal method.

It will now be assumed that the calling selector is on frame MSP4 of the second subdivision. Then a switch similar to switch *cisp'1* in incoming connector CSP5 connects the calling selector to receiver RSP4. All the operations then develop according to a method previously described, the sole difference being that outgoing connector CSP4 does not have to send the position of its selection magnets, because the calling selector is comprised in the frame containing it.

Only the case of local calls has been considered in the foregoing descriptions, but it is quite obvious that the group-selecting set allows routing calls originating from or terminating at distant exchanges, or still transit calls. In the first case, the circuit incoming into the exchange involved terminates through suitable equipment at a group-selecting means giving access to local subscribers; in the second case, the lines outgoing to the distant exchange are connected to the group-selecting means through suitable equipment. The third case is merely a combination of the first two.

It is quite obvious that the foregoing descriptions have been given only as a nonlimitative example and that numerous modifications can be made without departing from the scope of the invention. Said descriptions refer to the case of a system using crossbar switches but a certain number of the suggested arrangements could be applied to other telephone systems, such as those using rotary switches. It would also be possible to provide crossbar switches comprising magnets differently arranged or of different capacity, as also to change the number of members used or the number of selectors in the various subdivisions.

What is claimed is:

1. An automatic telephone system comprising a first selection stage having a plurality of first selectors, a second selection stage having a plurality of second selectors connected to the banks of said first selectors, a plurality of lines divided into groups and connected to the banks of said second selectors, a control device common to the selectors of both said stages, means in said control device for receiving signals representing a dialled called number, means controlled by said receiving means for marking the free ones of said lines of the called group with a "calling" designation on the banks of said second selectors having access to said lines, means in turn for marking said second selectors with said "calling" designation on the banks of the first selectors having access to said marked second selectors, means in said common control device for thereafter seizing a first selector and causing it to hunt for a second selector marked with said "calling" designation and to connect itself thereto, and means for causing the second selector thus seized to hunt for a line marked with said "calling" designation and to connect with said line.

2. An automatic telephone system, as defined in claim 1, in which there are a plurality of groups of first and second selector stages and in which the lines are multipled to the banks of the second selectors in said groups of second selector stages, whereby any selector in a first stage has access to all said lines.

3. An automatic telephone system, according to claim 1, further comprising an incoming connector adapted to connect a first selector to the common control device when said first selector is seized, the marking means including a marker for marking the free lines of the group corresponding to the called number dialled on the second selector banks and second outgoing connectors for marking on the first selector banks all the available second selectors having marked lines on their banks, a first outgoing connector, means for temporarily connecting said first outgoing connector with the seized first selector and for causing said first outgoing connector to hunt for a second selector in the calling position, and means for temporarily connecting a second outgoing connector with the second selector which has been chosen and is hunting for a marked line.

4. An automatic telephone system, according to claim 1, in which the first and second selectors are crossbar switches having selection magnets, the means for causing hunting of the seized first and second selectors including the selection magnets of said switches.

5. An automatic telephone system, according to claim 1, in which the first and second selectors are crossbar multi-switches having selection magnets and in which at least one individual switch in one of said first selector multi-switches is adapted to operate as an incoming connector for connecting a seized first selector to the common control device, and one set of selection magnets in another multi-switch is adapted to operate as an outgoing connector, means for causing the selection magnets acting as an outgoing connector to control the seized first selector when said first seized selector is in the same multi-switch as said outgoing connector, and means for causing selective indications to be sent from the multi-switch containing the outgoing connector to the multi-switch containing the seized first selector when said first selector is in another multi-switch in order to control the selective magnets of said seized first selector.

6. An automatic telephone system, according to claim 5, in which the calling first selector and the outgoing connector are in two different multi-switches and further comprising means operated by the incoming connector temporarily connected to a seized first selector for sending a signal to the outgoing connector indicating the particular multi-switch containing the seized first selector, and means in said outgoing connector responsive to said signal for sending selective indications to cause the operation of the selection magnets of the calling first selector.

7. An automatic telephone system, according to claim 6, in which an individual switch of a first selector multi-switch is assigned to all or part of the selectors of that multi-switch for connection of said selectors to the receiving means, the means for sending the signal to the outgoing connector being connected over a bank contact of said individual switch.

8. An automatic telephone system, according to claim 7, in which the means in the outgoing connector for sending selective indications to the seized first selector comprises contacts operated by the selection magnets of said outgoing connector.

9. An automatic telephone system, according to claim 1, in which there are a plurality of groups of first and second selector stages and in which each group has its common control device, and in which each of the first and second selectors is an individual switch of a crossbar multi-switch, further comprising means for connecting a combination of particular individual selector switches from different multiswitches as an incoming connector adapted to connect the other individual selector switches of the associated multi-switches to the associated common control devices.

10. An automatic telephone system, according to claim 1, further comprising an incoming connector adapted to connect a first selector to the common control device when said first selector is seized, the marking means including a marker for marking the free lines of the group corresponding to the called number dialled on the second selector banks and second outgoing connectors for marking on the first selector banks all the available second selectors having marked lines on their banks, means for temporarily connecting a second outgoing connector with the second selector which has been chosen and is hunting for a marked line, means in said second outgoing connector for connecting said marker to a line definitely selected by said outgoing connector, means in said marker for testing said line to determine if it has been selected only by the selectors associated therewith, and means responsive to the operation of said testing means for transmitting a signal to said connected first selector to complete the connection.

11. An automatic telephone system, according to claim 10, further comprising a timing device in the marker adapted to assume a particular condition of operation a predetermined time interval from the initiation of its operation, means to initiate the operation of said timing device when said marker has been connected to a line selected by the second outgoing connector, means controlled by the operation of the testing means in the marker for arresting the operation of said timing device, means operated when said timing device has assumed said particular condition of operation for removing the marking from the free lines of the group on the banks of the second selector, means for releasing said second selector when said marking is removed, and means controlled by the release of said second selector for releasing all seized portions of the first and second selection stages.

References Cited in the file of this patent

UNITED STATES PATENTS 2,235,803 Carpenter -------------- Mar. 18, 1941